(12) United States Patent
Chua et al.

(10) Patent No.: US 12,013,043 B2
(45) Date of Patent: Jun. 18, 2024

(54) TRIGGERABLE MECHANISMS AND FRAGMENT CONTAINMENT ARRANGEMENTS FOR SELF-DESTRUCTING FRANGIBLE STRUCTURES AND SEALED VESSELS

(71) Applicant: Palo Alto Research Center Incorporated, Palo Alto, CA (US)

(72) Inventors: Christopher L. Chua, San Jose, CA (US); Julie Ann Bert, Palo Alto, CA (US); Steven Neltner, San Carlos, CA (US); Emily Coker, Oakland, CA (US)

(73) Assignee: Xerox Corporation, Norwalk, CT (US)

(*) Notice: Subject to any disclaimer, the term of this patent is extended or adjusted under 35 U.S.C. 154(b) by 750 days.

(21) Appl. No.: 17/129,344

(22) Filed: Dec. 21, 2020

(65) Prior Publication Data

US 2022/0196169 A1 Jun. 23, 2022

(51) Int. Cl.
*B63C 9/00* (2006.01)
*B63B 22/18* (2006.01)
*F16K 17/40* (2006.01)

(52) U.S. Cl.
CPC .............. *F16K 13/04* (2013.01); *B63B 22/18* (2013.01); *B63C 9/00* (2013.01); *Y10T 137/1699* (2015.04)

(58) Field of Classification Search
CPC F16K 13/04; B63C 9/00; B63B 22/18; B63B 22/24; B63B 2022/006; B26F 3/00; B25D 5/02; B25D 2250/255; Y10T 137/1782; Y10T 137/1669; Y10T 137/1699; Y10T 137/1744
USPC ........................... 137/67, 68.17, 68.18, 68.11
See application file for complete search history.

(56) References Cited

U.S. PATENT DOCUMENTS

| | | | |
|---|---|---|---|
| 1,839,884 | A | 1/1932 | Loepsinger |
| 2,529,210 | A | 11/1950 | Butler |
| 3,397,278 | A | 8/1968 | Pomerantz |
| 3,601,114 | A | 8/1971 | Cook |
| 3,633,596 | A | 1/1972 | Gerber |
| 3,666,967 | A | 5/1972 | Keister et al. |
| 3,673,667 | A | 7/1972 | Loewenstein et al. |

(Continued)

FOREIGN PATENT DOCUMENTS

| | | |
|---|---|---|
| DE | 102004015546 | 10/2005 |
| EP | 3086363 | 10/2016 |
| WO | 01/43228 | 6/2001 |

OTHER PUBLICATIONS

Chua, U.S. Appl. No. 17/125,644, filed Dec. 17, 2020.
Limb et al., U.S. Appl. No. 16/537,258, filed Aug. 9, 2019.

*Primary Examiner* — Craig J Price
*Assistant Examiner* — Andrew J Rost
(74) *Attorney, Agent, or Firm* — Mueting Raasch Group

(57) ABSTRACT

An apparatus comprises a frangible structure coupled or integral to at least a portion of the apparatus and a triggerable mechanism disposed at or proximate the frangible structure. The triggerable mechanism is configured to break the frangible structure in response to a trigger signal. A containment structure is disposed on or over at least a portion of the frangible structure. The containment structure is configured to allow at least the portion of the frangible structure to deform or change shape in response to breaking of the frangible structure while keeping substantially all fragments of at least the portion of the broken frangible structure together.

22 Claims, 14 Drawing Sheets

(56) References Cited

U.S. PATENT DOCUMENTS

| | | | |
|---|---|---|---|
| 3,716,068 A * | 2/1973 | Addison | E21B 34/02 |
| | | | 72/464 |
| 3,882,323 A | 5/1975 | Smolker | |
| 4,102,664 A | 7/1978 | Dumbaugh, Jr. | |
| 4,139,359 A | 2/1979 | Johnson et al. | |
| 4,155,307 A | 5/1979 | Humphreys et al. | |
| 4,241,627 A * | 12/1980 | Snow | B67B 7/92 |
| | | | 294/99.2 |
| 4,471,895 A | 9/1984 | Lisec, Jr. | |
| 4,558,622 A | 12/1985 | Tausheck | |
| 4,598,274 A | 7/1986 | Holmes | |
| 4,673,453 A | 6/1987 | Georgii | |
| 4,739,555 A | 4/1988 | Jurgens | |
| 5,374,564 A | 12/1994 | Bruel | |
| 5,509,576 A * | 4/1996 | Weinheimer | B63C 9/24 |
| | | | 222/52 |
| 5,584,219 A | 12/1996 | Dunn et al. | |
| 5,791,056 A | 8/1998 | Messina | |
| 6,327,978 B1 | 12/2001 | Turano et al. | |
| 6,418,628 B1 | 7/2002 | Steingass | |
| 6,441,354 B1 | 8/2002 | Seghatol et al. | |
| 6,494,225 B1 | 12/2002 | Olewicz et al. | |
| 6,926,204 B2 | 8/2005 | Vacherand et al. | |
| 7,002,517 B2 | 2/2006 | Noujeim | |
| 7,025,013 B1 | 4/2006 | Staerzl et al. | |
| 7,068,254 B2 | 6/2006 | Yamazaki et al. | |
| 7,153,758 B2 | 12/2006 | Hata et al. | |
| 7,554,085 B2 | 6/2009 | Lee | |
| 7,880,248 B1 | 2/2011 | Pham et al. | |
| 7,896,988 B2 | 3/2011 | Mohler | |
| 7,944,049 B2 | 5/2011 | Fujii | |
| 8,130,072 B2 | 3/2012 | De Bruyker et al. | |
| 8,448,554 B2 | 5/2013 | Koide et al. | |
| 8,495,944 B2 | 7/2013 | Koide et al. | |
| 8,671,814 B2 | 3/2014 | Fujiwara et al. | |
| 8,695,263 B2 | 4/2014 | Murray | |
| 8,740,030 B2 | 6/2014 | Purdy et al. | |
| 9,154,138 B2 | 10/2015 | Limb et al. | |
| 9,294,098 B2 | 3/2016 | Shah et al. | |
| 9,356,603 B2 | 5/2016 | Limb et al. | |
| 9,577,047 B2 | 2/2017 | Chua et al. | |
| 9,630,870 B2 | 4/2017 | Zhao et al. | |
| 9,691,873 B2 | 6/2017 | Rogers et al. | |
| 9,780,044 B2 | 10/2017 | Limb et al. | |
| 9,790,128 B2 | 10/2017 | Garner et al. | |
| 10,012,250 B2 | 7/2018 | Limb et al. | |
| 10,026,579 B2 | 7/2018 | Whiting et al. | |
| 10,026,651 B1 | 7/2018 | Limb | |
| 10,224,297 B2 | 3/2019 | Chua et al. | |
| 10,308,543 B2 | 6/2019 | Lee | |
| 10,332,717 B2 | 6/2019 | Whiting et al. | |
| RE47,570 E | 8/2019 | Limb et al. | |
| 10,648,491 B2 | 5/2020 | Limb et al. | |
| 10,717,669 B2 | 7/2020 | Murphy et al. | |
| 2003/0089755 A1 | 5/2003 | Peers-Smith et al. | |
| 2004/0031966 A1 | 2/2004 | Forrest et al. | |
| 2004/0222500 A1 | 11/2004 | Aspar et al. | |
| 2005/0061032 A1 | 3/2005 | Yoshizawa | |
| 2005/0082331 A1 | 4/2005 | Yang | |
| 2005/0084679 A1 | 4/2005 | Sglavo et al. | |
| 2005/0176573 A1 | 8/2005 | Thoma et al. | |
| 2006/0138798 A1 | 6/2006 | Oehrlein | |
| 2006/0270190 A1 | 11/2006 | Nastasi et al. | |
| 2007/0113886 A1 | 5/2007 | Arao et al. | |
| 2008/0029195 A1 | 2/2008 | Lu | |
| 2008/0311686 A1 | 12/2008 | Morral et al. | |
| 2009/0086170 A1 | 4/2009 | El-Ghoroury et al. | |
| 2010/0035038 A1 | 2/2010 | Barefoot et al. | |
| 2010/0133641 A1 | 6/2010 | Kim | |
| 2010/0225380 A1 | 9/2010 | Hsu et al. | |
| 2011/0048756 A1 | 3/2011 | Shi et al. | |
| 2011/0089506 A1 | 4/2011 | Hoofman et al. | |
| 2011/0183116 A1 | 7/2011 | Hung et al. | |
| 2012/0052252 A1 | 3/2012 | Kohli et al. | |
| 2012/0073763 A1 | 3/2012 | Loy | |
| 2012/0088134 A1 * | 4/2012 | Wood | E21B 33/06 |
| | | | 429/90 |
| 2012/0135177 A1 | 5/2012 | Cornejo et al. | |
| 2012/0135195 A1 | 5/2012 | Glaesemann et al. | |
| 2012/0196071 A1 | 8/2012 | Cornejo et al. | |
| 2012/0288676 A1 | 11/2012 | Sondergard et al. | |
| 2013/0037308 A1 | 2/2013 | Wang et al. | |
| 2013/0082383 A1 | 4/2013 | Aoya | |
| 2013/0140649 A1 | 6/2013 | Rogers et al. | |
| 2013/0192305 A1 | 8/2013 | Black et al. | |
| 2013/0273717 A1 | 10/2013 | Hwang et al. | |
| 2014/0060347 A1 | 3/2014 | Sahebkar Yazdi | |
| 2014/0091374 A1 | 4/2014 | Assefa et al. | |
| 2014/0103957 A1 | 4/2014 | Fritz et al. | |
| 2014/0266946 A1 | 9/2014 | Bily et al. | |
| 2014/0300520 A1 | 10/2014 | Nguyen et al. | |
| 2014/0323968 A1 | 10/2014 | Rogers et al. | |
| 2014/0339265 A1 | 11/2014 | Marone et al. | |
| 2015/0001733 A1 | 1/2015 | Karhade et al. | |
| 2015/0044445 A1 | 2/2015 | Garner et al. | |
| 2015/0076677 A1 | 3/2015 | Ebefors et al. | |
| 2015/0089977 A1 | 4/2015 | Li | |
| 2015/0102852 A1 | 4/2015 | Limb et al. | |
| 2015/0121964 A1 | 5/2015 | Zhao et al. | |
| 2015/0229028 A1 | 8/2015 | Bily et al. | |
| 2015/0232369 A1 | 8/2015 | Marjanovic et al. | |
| 2015/0318618 A1 | 11/2015 | Chen et al. | |
| 2015/0348940 A1 | 12/2015 | Woychik et al. | |
| 2015/0358021 A1 | 12/2015 | Limb et al. | |
| 2015/0372389 A1 | 12/2015 | Chen et al. | |
| 2016/0122225 A1 | 5/2016 | Wada et al. | |
| 2016/0137548 A1 | 5/2016 | Cabral, Jr. et al. | |
| 2017/0036942 A1 | 2/2017 | Abramov et al. | |
| 2017/0217818 A1 | 8/2017 | Dumenil et al. | |
| 2017/0248246 A1 | 8/2017 | Valentin | |
| 2017/0292546 A1 | 10/2017 | Limb et al. | |
| 2018/0005963 A1 | 1/2018 | Limb et al. | |
| 2018/0033577 A1 | 2/2018 | Whiting et al. | |
| 2018/0033742 A1 | 2/2018 | Chua et al. | |
| 2018/0114761 A1 | 4/2018 | Chua et al. | |
| 2018/0306218 A1 | 10/2018 | Limb et al. | |
| 2018/0330907 A1 | 11/2018 | Whiting et al. | |
| 2019/0106069 A1 | 4/2019 | Wheeler et al. | |
| 2019/0172800 A1 | 6/2019 | Chua et al. | |
| 2019/0311872 A1 | 10/2019 | Whiting et al. | |
| 2020/0096123 A1 | 3/2020 | Czechowski | |
| 2020/0172430 A1 | 6/2020 | Limb et al. | |
| 2020/0176200 A1 | 6/2020 | Limb et al. | |
| 2020/0191285 A1 | 6/2020 | Czechowski | |
| 2020/0308041 A1 | 10/2020 | Murphy et al. | |
| 2020/0348112 A1 | 11/2020 | Chua et al. | |
| 2021/0190026 A1 | 6/2021 | Qin et al. | |
| 2022/0055722 A1 | 2/2022 | Gummin et al. | |
| 2022/0196169 A1 | 6/2022 | Chua et al. | |

* cited by examiner

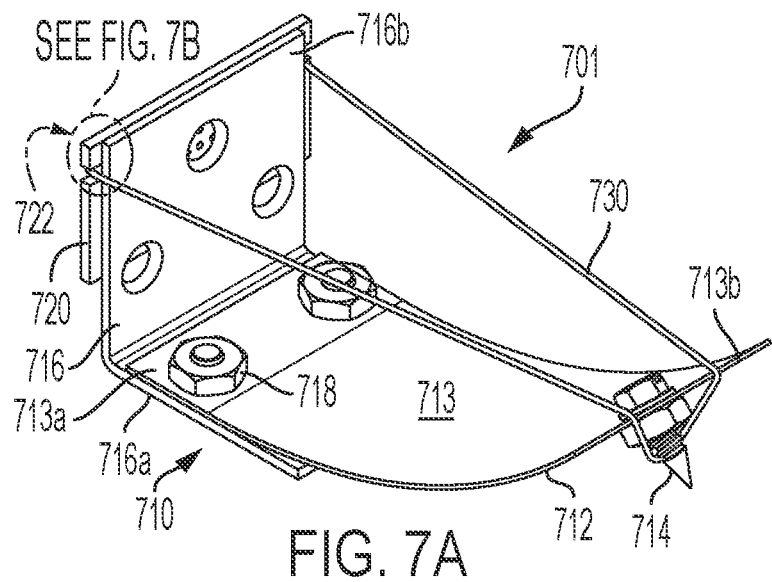
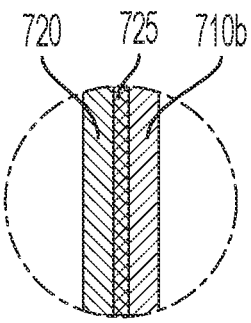
FIG. 7A
FIG. 7B
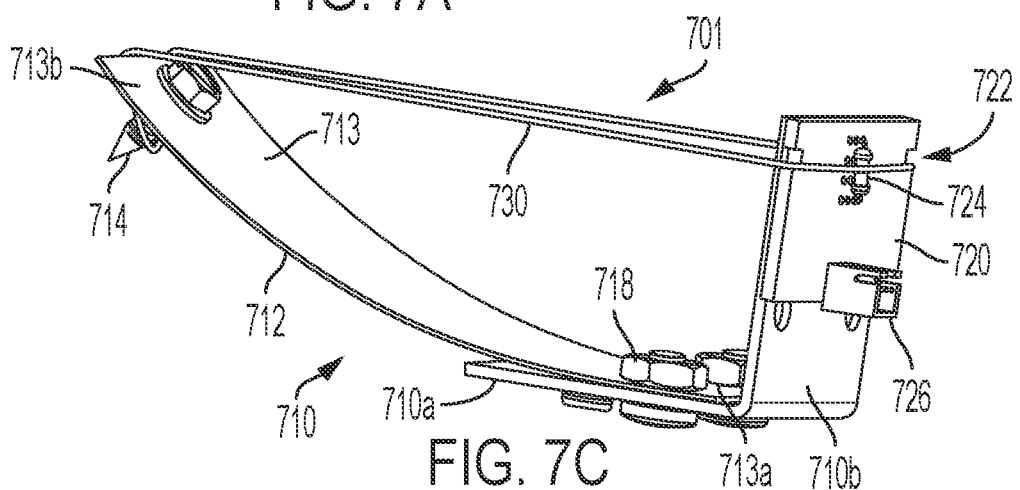
FIG. 7C
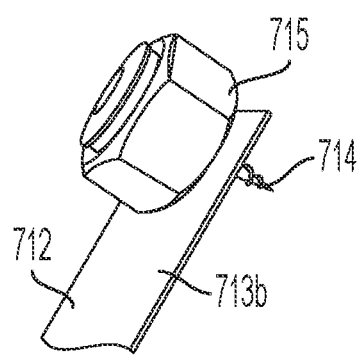
FIG. 7D

TRIGGERABLE MECHANISMS AND FRAGMENT CONTAINMENT ARRANGEMENTS FOR SELF-DESTRUCTING FRANGIBLE STRUCTURES AND SEALED VESSELS

STATEMENT REGARDING FEDERALLY SPONSORED RESEARCH AND DEVELOPMENT

This invention is based upon work supported by DARPA under Contract No. DARPA-OOT-DUST-Float-Rsrc. The Government has certain rights to this invention.

TECHNICAL FIELD

This disclosure relates generally to triggerable mechanisms and fragment containment arrangements for self-destructing frangible structures and sealed vessel, and to related systems and methods.

BACKGROUND

Systems and structures capable of physically self-destructing in a controlled, triggerable manner are useful in a variety of applications, such as reducing waste, maintaining supply chain integrity, scuttling buoys, and/or recycling waste products.

BRIEF SUMMARY

Some embodiments are directed to an apparatus comprising a frangible structure coupled or integral to at least a portion of the apparatus and a triggerable mechanism disposed at or proximate the frangible structure. The triggerable mechanism is configured to break the frangible structure in response to a trigger signal. A containment structure is disposed on or over at least a portion of the frangible structure. The containment structure is configured to allow at least the portion of the frangible structure to deform or change shape in response to breaking of the frangible structure while keeping substantially all fragments of at least the portion of the broken frangible structure together.

Some embodiments are directed to a method comprising receiving a trigger signal by an apparatus comprising a frangible structure, breaking the frangible structure by a triggerable mechanism of the apparatus in response to the trigger signal, allowing, by a containment structure disposed on or over at least a portion of the frangible structure, at least the portion of the frangible structure to deform or change shape in response to breaking of the frangible structure while keeping substantially all fragments of at least the portion of the broken frangible structure together.

Some embodiments are directed to an apparatus comprising a frangible structure coupled or integral to at least a portion of the apparatus and comprising a pre-weakened region. A triggerable mechanism is disposed at or proximate the pre-weakened region, the triggerable mechanism configured to cause the pre-weakened region to break in response to a trigger signal.

The above summary is not intended to describe each disclosed embodiment or every implementation of the present disclosure. The figures and the detailed description below more particularly exemplify illustrative embodiments.

BRIEF DESCRIPTION OF DRAWINGS

Throughout the specification reference is made to the appended drawings wherein:

FIGS. 7A-7D illustrate a mechanical actuator assembly in accordance with various embodiments;

The figures are not necessarily to scale. Like numbers used in the figures refer to like components. However, it will be understood that the use of a number to refer to a component in a given figure is not intended to limit the component in another figure labeled with the same number.

DETAILED DESCRIPTION OF ILLUSTRATIVE EMBODIMENTS

Figure 1:
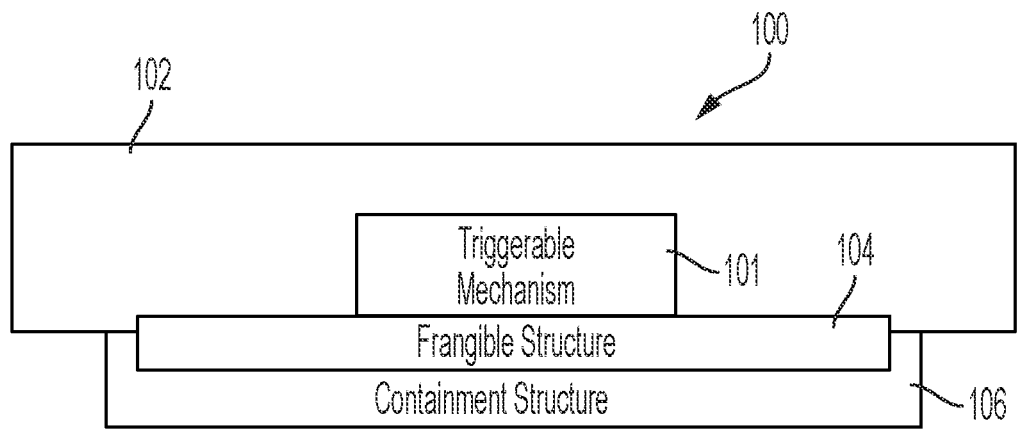
FIG. 1 shows an apparatus comprising a structure which includes a triggerable mechanism configured to break a predetermined breakable region of the structure and a fragment containment structure in accordance with various embodiments.

Embodiments disclosed herein relate to approaches for fracturing structures into smaller pieces in a controlled, triggerable manner and for keeping substantially all of the smaller pieces together. Frangible glass structures, especially when tempered; e.g., by chemical ion-exchange or by thermal quenching, are structurally very strong and become increasingly difficult to fracture with increasing thickness. Many applications require the robustness or stiffness of thicker glass, for example. As discussed below, triggerable mechanisms capable of reliably and controllably fracturing frangible structures, in particular thick frangible structures, include mechanical devices and pressure devices actuatable by a trigger source operably coupled to an electrical power source. The mechanical actuator assemblies and electrically-activated pressure devices disclosed herein can be physically small and lightweight, yet provide operational robustness that avoids unintentional triggering.

Many sealed systems, such as sensor buoys and air vessels, require controlled scuttling, so they sink and fall out of their normal operating environment after their useful life. Many of these systems utilize wall structures made of hard shells, such as metal, glass, wood, cardboard or plastic, that need to be breached to allow water or air to flow in or out of their enclosed chamber to sink the buoy or vessel. A key challenge is to provide a mechanism to scuttle such vessels in a simple, low cost, safe, and reliable way.

Embodiments of the disclosure are respectively directed to an electrically-activated mechanical actuator assembly and an electrically-activated pressure device configured to damage or destroy a frangible structure or a frangible region of a rigid structure. The electrically-activated mechanical actuator assembly and the electrically-activated pressure device can be configured to damage or destroy a frangible container or a frangible portion of the container configured for floatation. The electrically-activated mechanical actuator assembly and the electrically-activated pressure device can also be configured to damage or destroy a stand-alone frangible structure not configured for floatation.

It can be appreciated that damaging, breaking or destroying a frangible structure or a frangible region of a rigid structure can produce fragments that scatter over a broad area. These fragments are energetic and can damage nearby objects or injure people. According to embodiments of the disclosure, structures comprising at least one frangible region and an electrically-activated mechanical actuator assembly or an electrically-activated pressure device include a containment structure configured to prevent or limit scattering of fractured fragments when the frangible region is broken by the mechanical actuator assembly or pressure device.

According to various embodiments, the containment structure comprises an outer layer disposed on or over the frangible structure or frangible region. The outer layer is configured to substantially capture and/or prevent fractured fragments from freely scattering. The containment structure can be in the form of an adhesive coating, a hard shell, or a compliant wrapping material. For example, an adhesive coating can be painted-on, sprayed-on, laminated, poured-on, taped-on, or dip-coated on the frangible structure or frangible region, and can take the form of materials such as liquid rubber, epoxy, or tape. The adhesive coating can be applied on the entire structure to be fractured or only on select areas.

Alternatively, or additionally, the containment structure can comprise a hard shell attached to the structure to be fractured to form a barrier so fragments from the fractured structure are substantially blocked from venturing to the other side of the shell. The shell can take the form of materials such as metal, plastic, wood, or cardboard. Besides a hard shell, the containment structure can also be in the form of a compliant wrap such as fabric, rubber, foam, or plastic tarp.

In the context of electrically-activated mechanical actuator assemblies of the disclosure, when activated by a trigger source operably coupled to an electrical power source, the mechanical actuator assembly forcibly moves an impact member into contact with a frangible portion of the structure (e.g., which may be all or only a region or regions of the structure), causing the frangible portion to break, fracture or shatter. For example, a buoy or other floatable vessel can include a tempered glass window to which a mechanical actuator assembly is mounted. When activated, the mechanical actuator assembly breaks the tempered glass window into small pieces because of the built-in stress induced by tempering. The small glass residues produce an unobstructed opening in the wall of the buoy or vessel that enables rapid sinking of the buoy or vessel. A containment structure disposed over the frangible portion of the structure prevents or limits scattering of the small pieces of glass when the frangible region is broken by the mechanical actuator assembly.

In the context of electrically-activated pressure devices of the disclosure, when activated by a trigger source operably coupled to an electrical power source, the pressure device is configured to produce a localized force that breaks a frangible portion of the structure (e.g., which may be all or only a region or regions of the structure), causing the frangible portion to break, fracture or shatter. The pressure device assembly is configured to produce the localized force in response to activation of a gas-emitting material by an electrical initiator couple to the electrical power source. For example, a buoy or other floatable vessel can include a tempered glass window to which a pressure device assembly is mounted. When activated, the pressure device assembly breaks the tempered glass window into small pieces because of the built-in stress induced by tempering. The small glass residues produce an unobstructed opening in the wall of the buoy or vessel that enables rapid sinking of the buoy or vessel. A containment structure disposed over the frangible portion of the structure prevents or limits scattering of the small pieces of glass when the frangible region is broken by the pressure device.

In various embodiments, the electrically-activated mechanical actuator assembly and the electrically-activated pressure device can be respectively configured to fracture a frangible structure (e.g., a sheet of frangible material) which is more than about 0.5 mm thick. For example, the thickness of the frangible structure may range from about 0.5 mm to about 2 mm (e.g., about 0.5 mm, about 1 mm, about 2 mm) or even greater than 2 mm. In some embodiments, the frangible portion of the structure may break into a multiplicity of small fragments, e.g., fragments that have length, width, and height dimensions of greater than about 10 mm, greater than about 900 µm, less than about 500 µm, or even less than about 100 µm.

Embodiments of the disclosure are directed to a mechanical actuator assembly configured to break a predetermined breakable region of a structure to which the mechanical actuator assembly is attached. The mechanical actuator assembly includes a spring arrangement and an impact member coupled to the spring arrangement. The mechanical actuator assembly also includes a restraint member operably coupled to the spring arrangement. A trigger source is operably coupled to an electrical power source. In some embodiments, the trigger source includes a heat source which is operably coupled to an electrical power source and is in thermal contact with the restraint member. In other embodiments, the trigger source includes an electromagnetic solenoid configured to actuate a component (e.g., a sharp object or cutting member) that breaks the restraint member. In further embodiments, the trigger source includes a electrostatic device configured to apply a voltage on a sharp electrode to create a large electric field.

The trigger source, in response to receiving current from the electrical power source, is configured to release or break the restraint member so as to allow the spring arrangement to forcibly move the impact member into contact with, and break, the predetermined breakable region. The mechanical actuator assembly can be actuated in response to an activation signal generated locally (e.g., via a timer or sensor signal) or remotely (e.g., via a remotely generated RF signal). Breaking the predetermined breakable region of the structure by the mechanical actuator assembly can facilitate ingress or egress of a liquid, a gas or a solid into and/or out of the structure.

Some embodiments are directed to a mechanical actuator assembly comprising a spring steel member anchored to a base. The spring steel member is cocked away from the base with a string that has a portion wrapped around a heating element. When the heating element is electrically activated, the string breaks and releases the spring steel member's mechanical energy, which then propels an attached sharp tip against a breakable component on the wall of a vessel, container or other structure. The breached area allows water or air to enter and/or exit the vessel, container or structure.

Other embodiments are directed to a mechanical actuator assembly comprising a torsion spring anchored to a base. The torsion spring is cocked toward the base with a string that has a portion wrapped around a heating element. When the heating element is electrically activated, the string breaks and releases the torsion spring's mechanical energy, which then propels an attached sharp tip against a breakable component on the wall of a vessel, container or other structure. The breached area allows water or air to enter and/or exit the vessel, container or structure.

Embodiments of the disclosure are directed to an electrically-activated pressure device configured to break a predetermined breakable region of a structure to which the pressure device is attached. The electrically-activated pressure device includes a bonding surface and an interior space. The bonding surface, which includes a bonding agent, bonds the pressure device to a surface of the structure at or proximate the predetermined breakable region. The bonding agent and the bonding surface are configured to bond the pressure vessel to the bonding location on the surface of the structure with a bonding force greater than a fracture limit of the predetermined breakable region of the structure over a cross-sectional area bounded by an inner perimeter of the interior space of the pressure vessel at the bonding surface. In general, the fracture limit is the force at which the breakable region of the structure fractures.

According to some embodiments, the electrically-activated pressure device is configured as a pressure vessel containing a gas-emitting material. An electrical initiator, when triggered, is configured to heat the gas-emitting material to an activation temperature of the gas-emitting material. Activation of the gas-emitting material causes a rapid release of a gas. The rapid release of gas within the pressure vessel, which is tightly bonded to the surface of the structure at or proximate the predetermined breakable region, produces a localized pressure that breaks at least the predetermined breakable region of the structure. The breached area of the predetermined breakable region allows water or air to enter and/or exit the structure, container or vessel.

FIG. 1 shows an apparatus 100 comprising a structure 102 which includes a predetermined breakable region 104 in accordance with various embodiments. The predetermined breakable region 104 defines a frangible portion or portions of the structure 102. In some implementations, the predetermined breakable region 104 defines only a portion, but not the entirety, of the structure 102. For example, the predetermined breakable region 104 can be implemented as a frangible region (e.g., a windowed region) integrated into a rigid (e.g., non-frangible) wall of the structure 102. In other implementations, the predetermined breakable region 104 defines nearly all (e.g., >90%), or the entirety, of the structure 102. For example, the structure 102 can be implemented as a vessel or a container defined or encompassed by a frangible wall or a wall-and-cover structure (e.g., glass vessel or buoy) configured for floatation (e.g., a so-called drifter).

A triggerable mechanism 101 is disposed within the structure 102. In some embodiments, the triggerable mechanism 101 includes an electrically-activated mechanical actuator. In other embodiments, the triggerable mechanism 101 includes an electrically-activated pressure device. The triggerable mechanism 101 is disposed at or proximate the predetermined breakable region 104 of the structure 102 and comprises, or is operably coupled to, a trigger source comprising an electrical power source (e.g., a conventional battery or other power source as discussed below). In the case of a rechargeable battery, the structure 102 can include or support a solar cell or cell array configured to charge the rechargeable battery.

In response to receiving current from the electrical power source, the trigger source activates the triggerable mechanism 101 which forcibly breaks the predetermined breakable region 104. A containment structure 106 is disposed over all or at least a portion of the predetermined breakable region 104. The containment structure 106 is configured to prevent or limit scattering of fractured fragments when frangible material at the predetermined breakable region 104 is broken by the triggerable mechanism 101.

Figure 2:
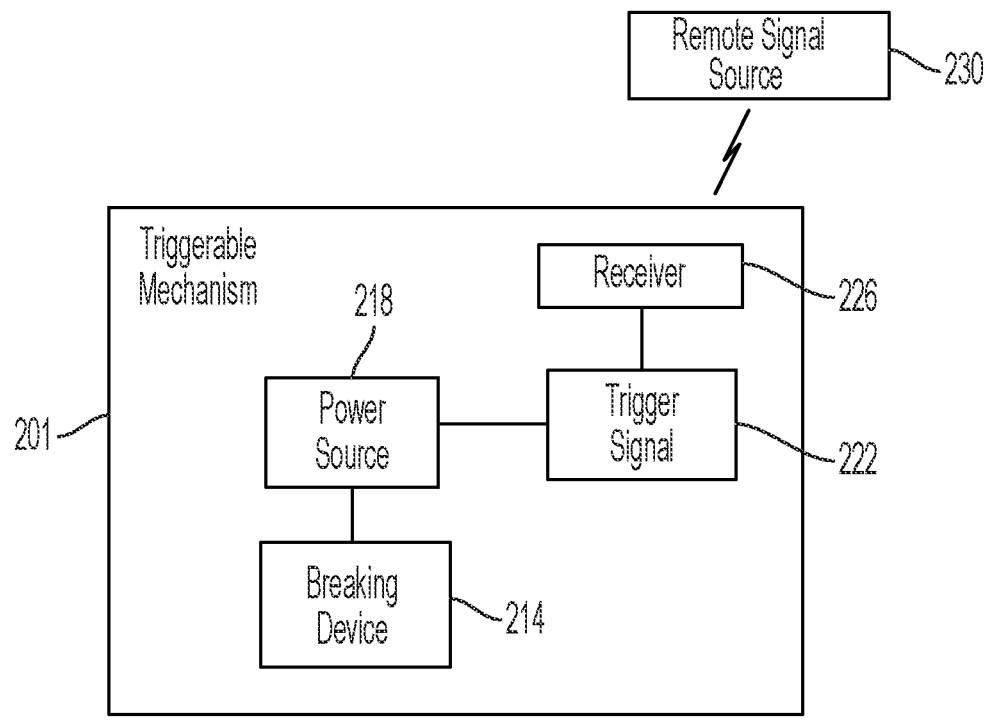
FIG. 2 is a block diagram of a triggerable mechanism suitable for incorporation in any of the structures disclosed herein in accordance with various embodiments.

FIG. 2 shows a triggerable mechanism 201 suitable for incorporation in any of the structures disclosed herein in accordance with various embodiments. The triggerable mechanism 201 includes a breaking device 214, which can be disposed at or proximate to the predetermined breakable region 104 of the structure 102 shown in FIG. 1. In some embodiments, the breaking device 214 includes and electrically-activated mechanical actuator. In other embodiments, the breaking device 214 includes an electrically-activated pressure device. The triggerable mechanism 201 also includes, or is operably coupled to, an electrical power source 218. In response to receiving current from the electrical power source 218, the triggerable mechanism 201 is energized and, in response, activates the breaking device 214.

As previously discussed, and with reference to FIG. 1, the predetermined breakable region 104 can define one or more frangible portions of some or all of the structure 102. For example, the predetermined breakable region 104 can encompass less than a major portion (e.g., <50%, such as <40%, 30%, 20%, 10% or 5%), more than a major portion (e.g., >50%), nearly the entirety (e.g., >80%, such as >85%, 90%, 95% or 98%) or the entirety (100%) of the structure 102. The breaking device 214 generates force sufficient to break the predetermined breakable region 104 of the structure 102.

In accordance with various embodiments in which the triggerable mechanism 201 includes an electrically-activated mechanical actuator, the breaking device 214 comprises a spring arrangement and an impact member, examples of which are described in detail hereinbelow. The spring arrangement can include at least one of a torsion spring and a spring steel member. It is understood that other types of spring mechanisms and objects that can be configured to produce a spring force are contemplated (e.g., a leaf spring, a cantilever spring, plastic plates). The spring arrangement includes or supports an impact member, such as a mechanical member configured to impart a high force or shock applied over a short time to the predetermined breakable region 104. The impact member, according to various embodiments, can include at least one of a metal or other rigid member with a sharpened, tapered, strengthened or hardened end (e.g., a screw, nail, pin, spike, punch, tack, peg, hammer-like member). According to various embodiments, electrically-activated mechanical actuator includes a trigger source comprising at least one of an electrically resistive heater (e.g., a resistor, such as a metal foil resistor or a carbon film resistor), an electric match, an arc lighter, a plasma lighter, and a semiconductor laser. In accordance with various embodiments, the power source 218 can include at least one of a battery, a DC power supply, an AC power supply, a supercapacitor, and an electro-magnetically-coupled charged source.

The triggerable mechanism 201 can include a trigger mechanism comprising a trigger signal circuit operably coupled to the power source 218 and configured to generate a trigger signal 222. In some embodiments, the trigger mechanism includes a receiver 226, such as an RF receiver (e.g., a satellite receiver) configured to receive a trigger signal generated from a remote signal source 230 (e.g., a communications satellite). The trigger signal circuit can alternatively or additionally include a timer and/or one or more sensors configured to generate the trigger signal 222. For example, a trigger signal 222 can be generated by the trigger signal circuit in response to expiration of a predetermined duration of time (e.g., days, weeks, months, years) or in response to a sensor signal generated by one or more on-board sensors (e.g., a signal generated by an on-board GPS sensor in response to detecting a position of a floatation structure 102 outside of a predefined geo-fenced region).

In some implementations, the trigger signal circuit can include a switch that can be can be remotely controlled allowing fracture of the structure 102 to be triggered from a location remote from the structure 102 (e.g., remote signal source 230). In such an embodiment, a wireless signal activates the switch to connect the power source 218 to the trigger source. In some implementations, the switch includes a MOSFET transistor that can be turned on or off by applying a bias voltage at the transistor's gate. In other implementations, the switch can be a silicon-controlled rectifier that can be turned on by applying a small current at one of its terminals. In further implementations, the switch can be a mechanical relay switch.

Figure 3:
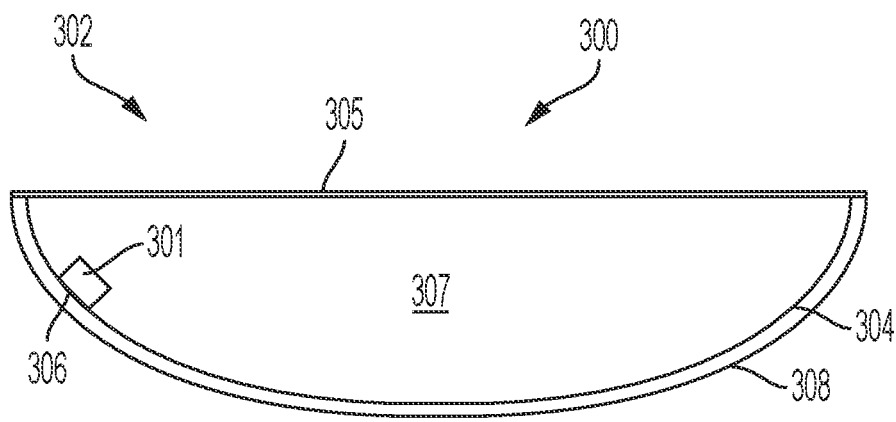
FIG. 3 shows an apparatus comprising a structure which includes a triggerable mechanism configured to break a predetermined breakable region of the structure and a fragment containment structure in accordance with various embodiments.

FIG. 3 shows an apparatus 300 comprising a structure 302 which can define a vessel, container, receptable, repository, holder, carrier, basin, tank, barrel, canister, drum, or other structure (referred to collectively herein as a structure for convenience) configured to contain or hold a liquid, a gas or a solid. The structure 302 includes a cover 305 and a wall 304 connected or coupled to the cover 305. A void 307 is defined within a space between the wall 304 and the cover 305. According to various embodiments, a liquid, a gas or a solid can be disposed in the void 307 of the structure 302. In the case of a drifter embodiment, air or other inert gas can be contained within the void 307 of the structure 302. A mechanical connection or coupling between the cover 305 and the wall 304 includes a sealing member or material, such as one or a combination of sealing tape and sealing adhesives described herein. The mechanical connection or coupling between the cover 305 and the wall 304 is preferably a waterproof connection or coupling in the case of a drifter embodiment and other embodiments.

The wall 304 includes one or more predetermined breakable regions 306. Each of the predetermined breakable regions 306 includes a frangible structure which is coupled or integral to at least a portion of the wall 304. Additionally, or alternatively, one or more breakable regions 306 can be coupled or integral to the cover 305. In some embodiments, the structure 302 is configured for floatation in a liquid, such as a body of water. For example, the structure 302 can be configured as a drifter for floatation in an ocean, sea, lake, or other body of water.

A triggerable mechanism 301 is disposed at or proximate each of the predetermined breakable regions 306. The triggerable mechanism 301 is disposed within the void 307 of the structure 302 and mounted to, or supported by, the wall 304 at or in proximate the predetermined breakable region 306. According to some embodiments, the predetermined breakable region 306 can define a portion, but not the entirety, of the wall 304 at or proximate the location of the triggerable mechanism 301. For example, the wall 304 can be formed from a rigid material, such as metal (e.g., stainless steel), plastic glass, wood, or a laminate or composite material. The predetermined breakable region 306 can include a sheet of frangible material according to any of the embodiments discussed herein.

In various embodiments, the predetermined breakable region 306 can define a minority (e.g., <50%), a majority (e.g., >50%) or the entirety of the wall 304. In further embodiments, the predetermined breakable region 306 can define a minority, a majority or the entirety of the wall 304 and, in addition, all or a portion of the cover 305. Although shown positioned along a side region of the wall 304, the triggerable mechanism 301 can be positioned at any location or locations of the wall 304 (e.g., near or at the bottom of the wall 304).

As previously discussed, the triggerable mechanism 301, when activated, is configured to generate a force sufficient to break the predetermined breakable region 306, thereby facilitating ingress and/or egress of a liquid, a gas or a solid into and/or out of the structure 302. According to embodiments in which the apparatus 300 is implemented as a drifter or other floatation apparatus, the triggerable mechanism 301, when activated, is configured to break the frangible structure or structures of the drifter in response to a trigger signal so as to cause the drifter to lose buoyancy, thereby resulting in scuttling of the drifter.

According to some embodiments, the structure 302 can include an electronics/sensor package. The electronics/sensor package can operate substantially independent of the one or more triggerable mechanisms 301. In some implementations, the electronics/sensor package can include a receiver, e.g., receiver 226 shown in FIG. 2, configured to receive a trigger signal 222 for activating the triggerable mechanism 301. The electronics/sensor package can serve as a backup power source or primary power source for the triggerable mechanisms 301. The electronic/sensor package can include a wide variety of electronic devices and/or sensors. For example, the electronic/sensor package can include one or more of a sea surface temperature sensor (SST), a high resolution sea surface temperature sensor (HRSST), a barometric pressure sensor, a drogue presence sensor, a probe sensor, a conductivity/temperature datalogger, a GPS sensor, a wireless RF transmitter or transceiver, a satellite communication transmitter or transceiver (e.g., an IRIDIUM satellite communication device to transmit sensor and other data), salinity sensor, fluorescence sensor, dissolved oxygen sensor, pCO2 sensor, and a low radar echo sensor to reduce the risk of collision or interference with surface crafts.

The containment structure 308 is disposed on or over at least a portion of the frangible structures (e.g., predetermined breakable regions 306) of the wall 304 and/or cover 305. In some embodiments, the containment structure 308 is disposed on or over the entirety of the wall 304 and/or cover 305 which includes one or more predetermined breakable regions 306. In other embodiments, the containment structure 308 is disposed on or over only the section or sections of the wall 304 and/or cover 305 which include one or more predetermined breakable regions 306 (e.g., multiple containment structures 308 disposed on or over multiple frangible structures of the structure 302).

The containment structure 308 is configured to allow at least a portion of its corresponding frangible structure to deform or change shape in response to breaking of the frangible structure, while keeping substantially all fragments of at least the portion of the broken frangible structure together. For example, a containment structure 308 disposed on or over a predetermined breakable region 306 of the wall 304 or cover 305 is configured to allow the predetermined breakable region 306 2 deform or change shape in response to breaking a frangible structure at the predetermined breakable region 306, while keeping substantially all fragments of the broken frangible structure together.

In accordance with some embodiments, the containment structure 308 is configured to substantially confine fragments of the broken frangible structure at the predetermined breakable region 306 within the containment structure 308. For example, the containment structure 308 can comprise a rigid or semi-rigid shell disposed on or over at least a portion of the frangible structure at the predetermined breakable region 306. For example, the shell can comprise one or a combination of a plastic, metal, laminate, and a composite material. By way of further example, the containment structure 308 can comprise a compliant material disposed on or over at least a portion of the frangible structure at the predetermined breakable region 306.

In some embodiments, the containment structure 308 comprises an adhesive coating disposed on or over at least a portion of the frangible structure at the predetermined breakable region 306. Suitable adhesive coatings can include any of those disclosed hereinbelow. In other embodiments, the containment structure 308 comprises an overly material configured to allow at least a portion of the frangible structure at the predetermined breakable region 306 2 deform or change shape in response to breaking of the frangible structure while keeping substantially all the fragments together. In further embodiments, the containment structure 308 comprises a patterned overlay layer configured to keep some of the fragments of the broken frangible structure at the predetermined breakable region 306 attached in one or more specified regions of the frangible structure while allowing other fragments to disperse in other regions of the frangible structure.

As was discussed previously, and in accordance with some embodiments, the apparatus 300 includes at least one frangible structure at a predetermined breakable region 306 and at least one non-frangible structure (e.g., a non-frangible portion of the wall 304 and/or cover 305), and the containment structure 308 is disposed on or over an entirety of the frangible structure. In accordance with other embodiments, the apparatus 300 includes at least one frangible structure at a predetermined breakable region 306 and at least one non-frangible structure, in the containment structure 308 is disposed on or over only a portion, but not the entirety, of the frangible structure. In such embodiments, the containment structure 308 is configured to allow at least the portion of the frangible structure to deform or change shape in response to breaking of the frangible structure, while keeping substantially all fragments together.

In various implementations, the frangible structure at the predetermined breakable region 306 comprises a sheet of frangible material. The sheet of frangible material can be made of a brittle or frangible material such as glass (e.g., standard or tempered), ceramic, plastic, laminated fillers of wood, metal or gypsum, clay, porcelain, and/or metal. A glass sheet of frangible material can comprise one or more of cast glass, slumped glass, untempered glass, tempered glass, thermally tempered glass, ion-exchanged glass, soda-lime glass, lead glass, borosilicate glass, aluminosilicate glass, alkali-aluminosilicate glass, silica glass, and sodium-rich glass. Although the structure 302 may be complex and include many different materials and shapes, the frangible material can be disposed at one or more predetermined breakable regions 306 each comprising, and covering, a void in the structure 302.

According to various embodiments, the predetermined breakable region 306 provided at one or more locations of the structure 302 (e.g., wall 304 and/or cover 305) comprises a void in the structure 302. A sheet of frangible material is disposed over, and extends across, the void. The sheet of frangible material is held in place over the void by sealing tape, sealing adhesive, or a combination of sealing tape and sealing adhesive. Various types of conventional and/or waterproof sealing tape and/or sealant adhesives can be used in accordance with any embodiments disclosed herein. Various arrangements for sealably affixing a frangible structure over a void in the structure 302 to define a predetermined breakable region 306, and other structures and features that can be incorporated in any of the embodiments disclosed herein, are disclosed in commonly-owned U.S. patent application Ser. No. 17/128,714 filed concurrently on Dec. 21, 2020, which is incorporated herein by reference in its entirety.

Suitable sealing tape and/or sealant adhesives include those containing polyurethane, silicone, MSP (modified silane polymer) and/or butyl rubber chemistries. Suitable sealing tape, for example, includes those that contain a highly concentrated rubber-based adhesive. Suitable sealing tape includes those commercially available under the following name brands: Gorilla®, T-Rex®, SolutioNerd®, Tape Ninja®, X-Treme Tape®, and Scotch®. Suitable sealing adhesives (e.g., flowable or sprayable sealants) include those containing liquid rubber (synthetic or natural) and/or any of the chemistries listed above. Suitable sealing adhesives include those commercially available under the following name brands: 3M™ building or marine adhesive sealant (e.g., Marine Adhesive Sealant 5200), Liquid Nails®, Flex Seal®, DAP®, LR® (Liquid Rubber), and LOCTITE®.

Figure 4:
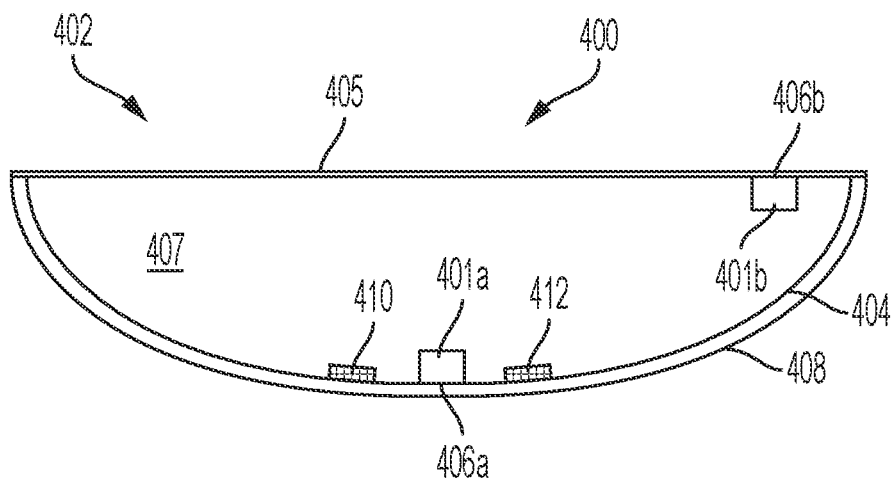
FIG. 4 shows an apparatus comprising a structure which includes a plurality of triggerable mechanisms configured to break a plurality of predetermined breakable regions of the structure and a fragment containment structure arrangement in accordance with various embodiments.

FIG. 4 shows an apparatus 400 comprising a structure 402 which includes first and second triggerable mechanisms 401a, 401b disposed at or proximate respective predetermined breakable regions 406a, 406b of the structure 402 in accordance with various embodiments. The representative structure 402 shown in FIG. 4 is configured as an apparatus, container, vessel or other structure configured for floatation. The structure 402 includes a wall 404 and a cover 405 connected or coupled together as previously described. A void 407 is defined within a space between the wall 404 and the cover 405. The structure 402 can, for example, be configured as a buoy or a drifter of a type previously described. In some embodiments, the wall 404 of the structure 402 (e.g., a buoy) is made of a stainless steel body capped by a flat cover 405. The cover 405 can be formed from metal, such as stainless steel, or plastic, for example. The structure 402 can also include an electronics/sensor package, such as the electronics/sensor package previously described.

The structure 402 includes one or more holes or apertures at or near the bottom of the structure 402 covered by a frangible structure to define a first predetermined breakable region 406a of the wall 404 as previously described. It is understood that the first predetermined breakable region 406a can be positioned at any location of the wall 404 below a predetermined waterline of the structure 402. A first triggerable mechanism 401a is disposed at or near the first predetermined breakable region 406a. The cover 405 includes one or more holes or apertures covered by a frangible structure to define a second predetermined breakable region 406b of the cover 405 as previously described. The second predetermined breakable region 406b can be positioned at any location of the cover 405, and is shown positioned at a peripheral location of the cover 405 in FIG. 4 as a representative location. It is understood that the second predetermined breakable region 406a can be positioned at any location of the cover 405 or the wall 404 above the predetermined waterline of the structure 402. A second triggerable mechanism 401b is disposed at or near the second predetermined breakable region 406b. Ballast 410, 412 can be mounted to the wall 404 at or near the bottom of the wall 404. Ballast 410, 412 is preferably positioned on the wall 404 below the predetermined waterline of the structure 402 and arranged to distribute weight within the structure 402.

As previously discussed, the triggerable mechanisms 401a, 401b, when activated, are each configured to generate force sufficient to break the frangible structure at their respective predetermined breakable region 406a, 406b. Breaking of the frangible structure at the second predetermined breakable region 406b by the second triggerable mechanism 401b facilitates venting of air from the cover 405 of the structure 402, while breaking of the first predetermined breakable region 406a by the first triggerable mechanism 401a facilitates ingress of liquid (e.g., ocean, sea or lake water) into the void 407 of the structure 402, causing scuttling of the structure 402.

In some embodiments, each of the triggerable mechanisms 401a, 401b can include, or be coupled to, an independent electrical power source (e.g., disparate batteries). In other embodiments, the triggerable mechanisms 401a, 401b can be coupled to a common (e.g., single) electrical power source arrangement. In the case of a common or single power source, the triggerable mechanisms 401a, 401b can be connected in parallel. The leads of the triggerable mechanisms 401a, 401b can be crimped together into a single header to facilitate simultaneous activation, or the electrical distribution can be implemented at the circuit board level (see PCB 720, 720a in FIGS. 7A-7G) with separate headers for each source. Alternatively, the triggerable mechanisms 401a, 401b can be connected in series, where a common current (instead of voltage) activates each triggerable mechanisms 401a, 401b.

According to various embodiments, particularly those in which the structure 402 is exposed to ocean, sea or lake water, all or a portion of the exterior surface of the structure 402 can be coated with an anti-biofouling chemical. For example, the coating of anti-biofouling chemical can have a thickness of about 1.5 to about 150 μm. A suitable anti-biofouling coating material is Silicone Slip Anti-Fouling Coating (Product #SS-567) available from Silicone Solutions in Cuyahoga Falls, Ohio).

Example

An experiment was conducted using a structure 402 of the type described with reference to FIG. 4 in order to verify the efficacy of scuttling buoys despite the presence of trapped air bubbles. In the experiment, the first predetermined breakable region 406a included an opening with a diameter of 0.5 inches and the second predetermined breakable region 406b included an opening with a diameter of 0.25 inches. After activation of the first and second triggerable mechanisms 401a, 401b, the chamber 407 of the structure 402 quickly filled with water which resulted in the structure 402 tipping over in about 28 seconds and ultimately sinking within about 30 seconds from the initial water ingress.

Figure 5:
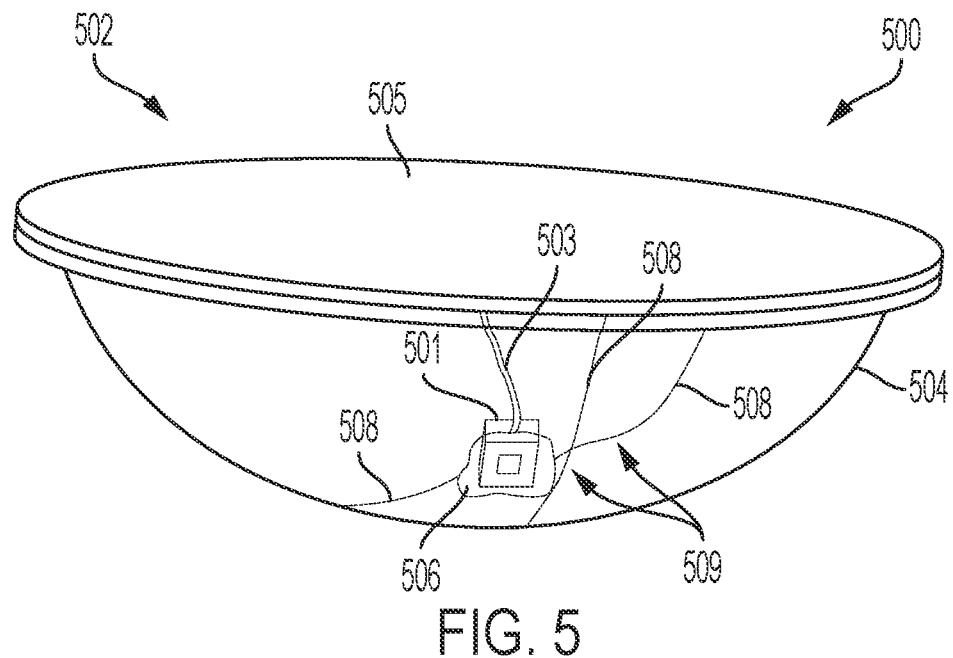
FIG. 5 shows an apparatus comprising a structure which includes a triggerable mechanism configured to break a pre-weakened region of the structure in accordance with various embodiments.

FIG. 5 shows an apparatus comprising a structure which includes a predetermined breakable region in accordance with various embodiments. The apparatus shown in FIG. 5 can be implemented in the form of any of the previously described apparatuses. In accordance with embodiments directed to FIG. 5, the apparatus includes a frangible structure coupled or integral to at least a portion of the apparatus and comprises a pre-weakened region. The pre-weakened region can extend along the entirety of the frangible structure or only a portion of the frangible structure. A triggerable mechanism is disposed at or proximate the pre-weakened region. The triggerable mechanism is configured to cause the pre-weakened region to break in response to a trigger signal.

FIG. 5 shows an apparatus 500 comprising a structure 502 which includes a cover 505 and a wall 504 connected or coupled to the cover 505 in a manner previously described. A void is defined within a space between the wall 504 and the cover 505 and can be configured to a liquid, a gas or a solid. In the case of a drifter embodiment, air or other inert gas can be contained within the void of the structure 502, and an electronics/sensor package of a type previously described can be positioned within the void.

The wall 504 and/or the cover 505 includes one or more predetermined breakable regions, each of which includes a frangible structure comprising a pre-weakened region 509. A triggerable mechanism 501 is disposed at or proximate each of the pre-weakened regions 509. The triggerable mechanism 501 is disposed within the void 507 of the structure 502 and mounted to, or supported by, the wall 504 and/or cover 505 at or proximate the pre-weakened region 509. The triggerable mechanism 501 can include an electrically-activated mechanical actuator assembly or an electrically-activated pressure device of a type described herein. The triggerable mechanism 501 is configured to generate a force sufficient to break at least the pre-weakened region 509 and, in some implementations, the frangible structure along with the pre-weakened region 509. In some embodiments, a containment structure of a type previously described can be disposed over all or at least a portion of the pre-weakened region 509.

According to some embodiments, the predetermined breakable region comprising the frangible structure with pre-weakened region 509 can define a portion, but not the entirety, of the wall 504 and/or cover 505. For example, the wall 504 and/or cover 505 can be formed from a rigid material, such as metal (e.g., stainless steel), plastic glass, wood, or a laminate or composite material. The predetermined breakable region can include a void in the rigid material and a sheet of frangible material according to any of the embodiments discussed herein. The sheet of frangible material can include the pre-weakened region 509.

According to some embodiments, the pre-weakened region 509 comprises a mechanically weakened portion 506 of the frangible structure. In other embodiments, the pre-weakened region 509 comprises a thinned portion of the frangible structure. In further embodiments, the pre-weakened region 509 comprises a mechanically-scribed scored line 508 on the frangible structure.

Figure 6:
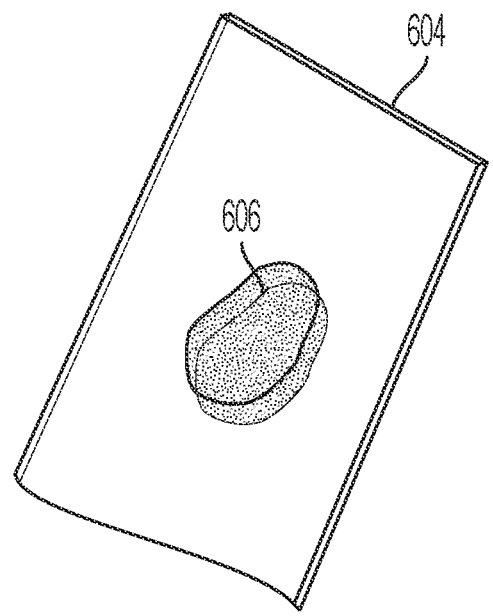
FIG. 6 illustrates a chemically weakened portion of the pre-weakened region shown in FIG. 5.

In accordance with other embodiments, the pre-weakened region 509 comprises a chemically weakened or damaged portion of the frangible structure. For example, and with reference to FIG. 6, the frangible structure 604 includes a chemically weakened portion 606. For example, the frangible structure 604 (e.g., glass) can include a chemically weakened spot 606 etched by hydrofluoric acid. The chemically weakened portion 606 can be created by placing a hydrofluoric acid-infused foam on a desired spot of the frangible glass structure. In some embodiments, the pre-weakened region 509 comprises both mechanically and chemically weakened portions of the frangible structure.

FIGS. 7A-7D illustrate a mechanical actuator assembly 701 in accordance with various embodiments. The mechanical actuator assembly 701 can be incorporated in any of the structures disclosed herein. The mechanical actuator assembly 701 includes a mechanical actuator 710 comprising a frame 716 and a spring arrangement 712 mechanically connected or coupled to the frame 716. In the embodiment shown in FIGS. 7A-7D, the frame 716 is an L-shaped metal bracket and the spring arrangement 712 includes a spring element in the form of an elongated spring steel member 713. A first end 713a of the spring steel member 713 is connected to a base 716a of the frame 716, such as by way of one or more nuts and bolts or, alternatively, one or more rivets or welds.

An impact member 714 is connected or coupled to the spring steel member 713 at a second end 713b of the spring steel member 713. The impact member 714 is depicted as a screw having a pointed tip passing through a hole in the spring steel member 713 and affixed at the second end 713b of the spring steel member 713 via a nut. It is understood that the impact member 714 can be implemented using any of previously described mechanical members configured to impart a high force or shock applied over a short time to a predetermined breakable region of a structure. In some embodiments, the spring steel member 713 can include a mass load 715 (e.g., a metal weight such as a large bolt and/or number of washers) connected to or situated proximate the impact member 714. The mass load 715 serves to increase the impact force imparted by the impact member 714.

The mechanical actuator 710 also includes a restraint member 730 operably coupled to the spring arrangement 712 and a backplate 716b extending at an angle (e.g., about 90 degrees) from the base 716a of the frame 716. As shown, the restraint member 730 maintains the spring steel member 713 in a cocked state via a tensile force maintained between the backplate 716b and the second end 713b of the spring steel member 713. The restraint member 730 is shown as a continuous loop member (e.g., a string) that extends around opposing side edges of the backplate 716b of the frame 716 and a portion of the impact member 714 (e.g., also contacting an edge surface of the second end 713b of the spring steel member 713). A printed circuit board (PCB) 720 is shown mounted to a back surface of the backplate 716b and includes side notches 722 configured to receive the restraint member 730 as it extends around the side surfaces of the backplate 716b of the frame 716. As is shown in FIG. 7B, the PCB 720 can be mounted to the back surface 710b of the backplate 716b via an adhesive 725 (e.g., dielectric adhesive tape) between the PCB 720 and the back surface 710b of the backplate 716b. It is understood that the PCB 720 can be mounted to the back surface 710b of the backplate 716b using any type of adhesive material or fastening arrangement.

The restraint member 730 is configured to maintain the second end 713b of the spring steel member 713 and the impact member 714 in a pre-actuation position without causing the restraint member 730 to release or break. More particularly, the spring steel member 713 has a spring force sufficient to maintain the impact member 714 in the pre-actuation position without causing the restraint member 730 to release or break. Additionally, the spring force of the spring steel member 713 is sufficient to cause the impact member 714 to break the predetermined breakable region of the structure in response to releasing or breaking of the restraint member 730.

The mechanical actuator assembly 701 includes a trigger source 724 operably coupled to an electrical power source (not shown) via an electrical connector 726. The electrical power source can include one or more of a battery, a DC power supply, an AC power supply, a supercapacitor, and an electro-magnetically-coupled charged source. As is best seen in FIG. 7C, the trigger source 724 and electrical connector 726 are disposed on PCB 720. According to some embodiments, the trigger source 724 comprises an electrically resistive heater such as a resistor. In other embodiments, the trigger source 724 can comprise an electric match, an arc lighter, a plasma lighter or a semiconductor laser. The restraint member 730 is in thermal contact with the trigger source 724. When activated, the heat generated by the trigger source 724 damages the restraint member 730 causing the restraint member 730 to release the spring 713 from its pre-actuation position.

In accordance with embodiments that employ a resistor as a trigger source, the resistor preferably has a relatively low resistance (e.g., about 5 Ohm to about 20 Ohm) and is operated above its specified power rating so as to intentionally cause it to overheat (e.g., melt). The resistor, when intentionally driven above its power rating, generates heat sufficient to burn through or melt the restraint member 730.

According to embodiments of a trigger source 724 that employs a resistor, a carbon film resistor or a metal foil resistor having a resistance of about 5 Ohm to about 25 Ohm and a power rating of about ⅛ Watt to about ¼ Watt can be used. The electrical power source coupled to the resistor via electrical connector 726 can be a conventional (e.g., a 9V alkaline or lithium-ion) battery, although a custom-made battery can be used. For example, the electrical power source can include a 9V alkaline battery, a 18650 battery or a CR123A battery. By way of further example, the electrical power source can include an alkaline battery configured to supply a peak current of between about 0.6 A to about 3.5 A. The resistor preferably has a resistance ranging from about one-eighth of an internal impedance of the electrical power source to about $V^2/P$, where V is a voltage of the electrical power source and P is a minimum electrical power needed to break the restraint member 730. In various embodiments employing common 9V alkaline batteries as the power source, the resistor can have a resistance ranging from about 5 Ohm to about 20 Ohm (e.g., ~10 Ohm) for good impedance matching. Other choices or resistor values could be more suitable for different types of power supplies or for different power delivery configurations.

As discussed previously, the mechanical actuator assembly 701 can be configured as a compact device. According to some embodiments, the base 716a of the L-bracket frame 716 can have a length and a width of about 1.5", and the backplate 716b of the L-bracket frame 716 can have a length of about 1.6" and a width of about 1.5". The spring steel member 713, in a relaxed (un-cocked) state, can have a length of about 3.75" and a width of about 1.5". A hole having a diameter of about 0.177" (to accommodate the impact member 714, e.g., a #10×½" piercing sheet metal screw) can be provided about 0.25" from the second end 713b of the spring steel member 713 and centered between opposing sides of the spring steel member 713. The spring steel member 713 can be rectangular in shape and formed using 1095 spring steel (e.g., 0.032", hardness RC50). The PCB 720 can have a width of about 1.7" and a height of about 0.9". The notches 722 can have a cut-in depth and a height of about 0.10", respectively. The resistor 724 can be a 10 Ohm metal film ¼ Watt resistor or a 10 Ohm carbon film ⅛ watt resistor. The restraint member 730 can be a braided nylon string (e.g., 131 lb available from T.W. Evans Cordage as item 12-500 No-1). The electrical power connector 726 can be an XH2 header.

Figure 7E:
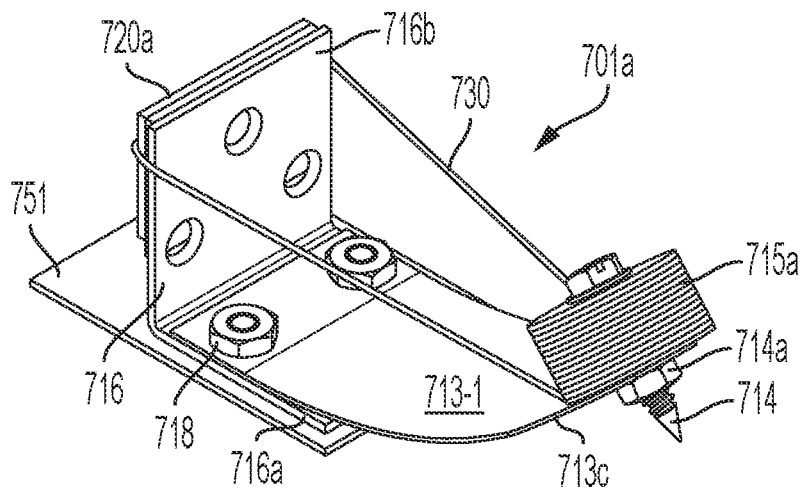
FIGS. 7E-7G illustrate a mechanical actuator assembly in accordance with various embodiments.
Figure 7F:
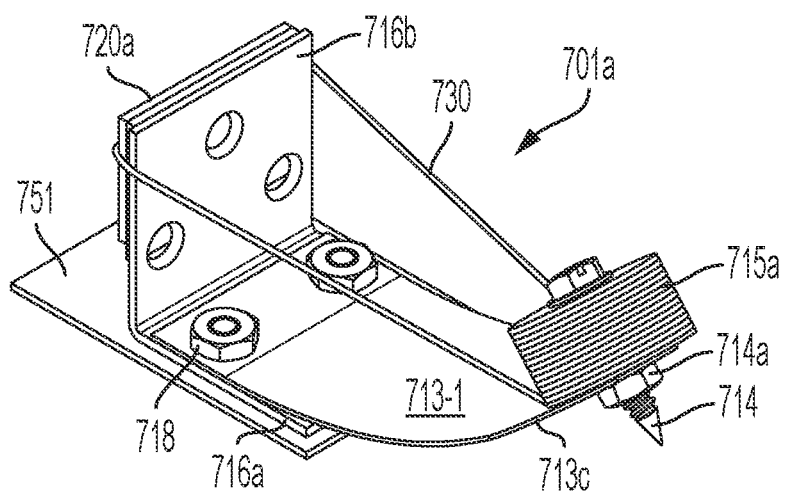
Figure 7G:
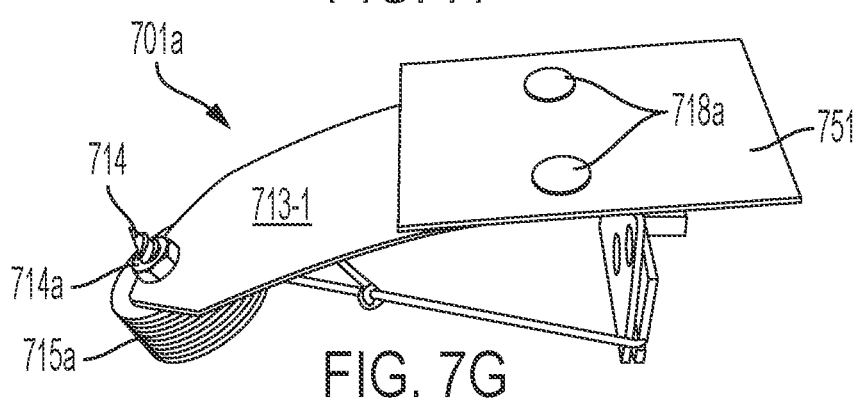

FIGS. 7E-7G illustrate a mechanical actuator assembly 701a in accordance with various embodiments. The mechanical actuator assembly 701a is structurally and functionally similar to the mechanical actuator assembly 701 shown in FIGS. 7A-7D. As such, many of the features which are common to the two mechanical actuator assemblies 701, 701a are not shown in FIGS. 7E-7G for purposes of clarity. In the embodiment shown in FIGS. 7E-7G, the elongated spring steel member 713a has a tapered second end 713c to which the impact member 714 is attached. The tapered shape of the second end 713c provides for a more compact design for a wide variety of structures (e.g., containers and vessels), particularly structures with curved walls. The mass load 715a, also attached at the second end 713c, comprises a stack of metal washers with central voids. The impact member 714 (e.g., a piercing sheet-metal screw) passes through the central voids of the mass load 715a and a hole provided near the distal tip of the second end 713c. The impact member 714 and mass load 715a are secured at the second end 713c by a nut 714a.

In the embodiment shown in FIGS. 7E-7G, the PCB 720a is mounted to the back surface of the backplate 716b. In this embodiment, the PCB 720a does not include notches 722 (see FIGS. 7A-7C) and has a width which is either coextensive with or smaller than that of the backplate 716b. As shown, the restraint member 730 (e.g., string) extends around the backplate 716b and the PCB 720a. The restraint member 730 also extends under or around the mass load 715a (shown as a stack of washers) and the head-side of the impact member 714. In this configuration, the restraint member 730 does not extend over the distal edge of the second and 713c, as is the case in the embodiment shown in FIGS. 7A-7C. The tie-down arrangement of the restraint member 730 shown in FIGS. 7A-7C eliminates risk of premature breakage of the restraint member 730 during operation.

As is also shown in the embodiment of FIGS. 7E-7G, and as best seen in FIG. 7G, the base 716a of the frame 716 is mounted to a plate 751 using fasteners 718a having a flat engagement surface that facilitates near-flush mounting (e.g., <0.030" screw head) of the mechanical actuator assembly 701a to the plate 751. The fasteners 718a can be flush-head studs or pins (e.g., PEM® Fasteners available from PennEngineering®). Flush mounting the mechanical actuator assembly 701a to the plate 751 advantageously prevents or significantly reduces tilting of the mechanical actuator assembly 701a when mounted to the plate 751 (e.g., a 1 mm thick base plate), and allows for use of a single layer of adhesive (e.g., 3M® VHP double-cited adhesive tape) to mount the plate 751 to a vessel structure (e.g., a vessel base surface as shown in FIG. 7H). The embodiment shown in FIGS. 7E-7G provides for ease of manufacture by simplifying the process of placing the spring steel member 713a in its cocked (pre-actuation) state.

Figure 8:
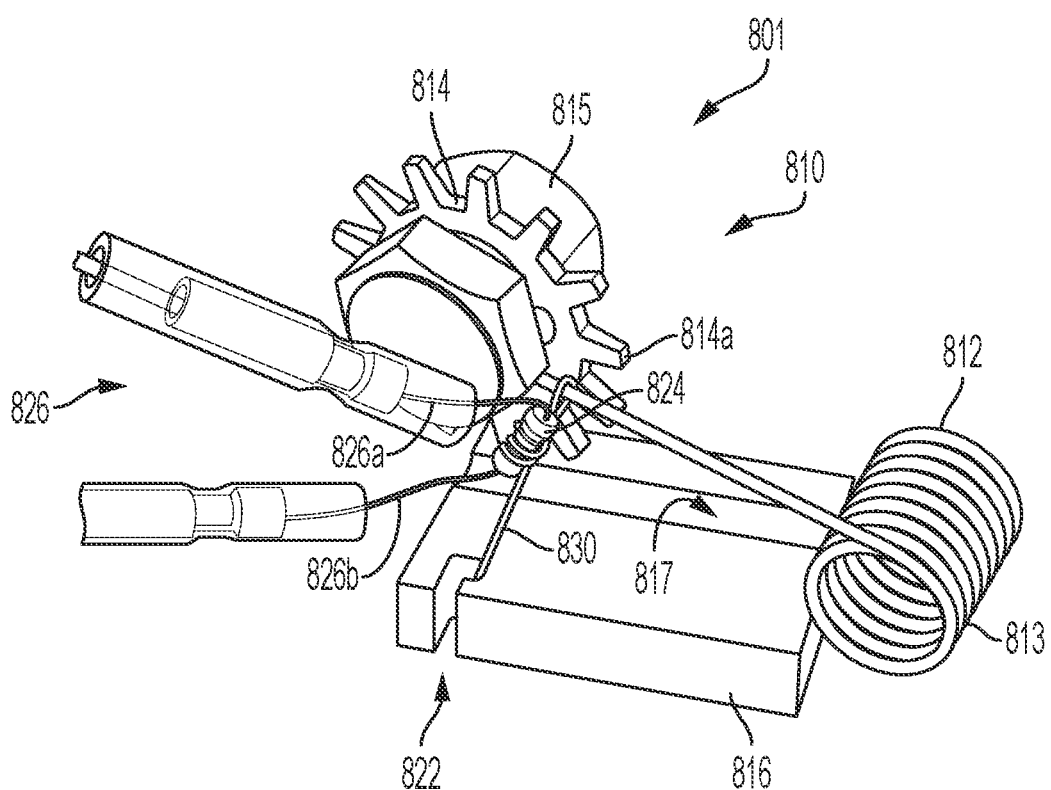
FIG. 8 illustrates a mechanical actuator assembly in accordance with various embodiments.

FIG. 8 illustrates a mechanical actuator assembly 801 in accordance with various embodiments. The mechanical actuator assembly 801 can be incorporated in any of the structures disclosed herein. The mechanical actuator assembly 801 includes a mechanical actuator 810 comprising a base 816 and a spring arrangement 812 mechanically connected or coupled to the base 816. In the embodiment shown in FIG. 8, the spring arrangement 812 includes a torsion spring 813. The base 816 incorporates a cut groove 817 to anchor a first leg (hidden from view) of the torsion spring 813. The first leg of the torsion spring 813 is pressed-fit into the groove 817. An optional adhesive can be included to strengthen the attachment. The groove 817 also functions to position the torsion spring 813 precisely relative to a tie-down location on the base 816. The tie-down location includes a notch 822 on the base 816 base that accommodates a restraint member 830 (e.g., a string).

The mechanical actuator 810 includes an impact member 814 coupled to the torsion spring 813. A load mass 815 (e.g., a nut and bolt) can be attached to the tip of a second end of the torsion spring 813 to store mechanical energy. The nut and bolt arrangement holds the impact member 814 securely in place, which is shown as a lock washer with protruding serrated teeth 814a. The torsion spring 813 and the load mass 815 are cocked backward with the restraining member 830 (e.g., string) which is looped around a trigger source 824 in the form of a resistor. The resistor 824 is designed to function as a heater, so it heats to a high temperature and breaks the restraint member 830 when activated by electrical current from a power source (e.g., a battery, not shown) electrically coupled to electrical leads 826a, 826b. When the mechanical actuator 810 is activated electrically, one or more serrated teeth 814a of the lock washer 814 hit the predetermined breakable region of a structure with an impact pressure that breaks a sheet of frangible material at the predetermined breakable region (e.g., which causes breaching the wall of the structure causing the structure to sink). The mechanical actuator assembly 801 can have a compact configuration with a footprint about the same as that of the representative mechanical actuator assembly 701 described above (e.g., about the same footprint, a somewhat smaller footprint (e.g., 5-15% smaller) or somewhat larger (e.g., 5-15% larger) footprint).

The components of a mechanical actuator assembly of the present disclosure are designed carefully in order for the device to work reliably and as intended. The spring torque-to-volume ratio for the designed pull back (cocked) position of the impact member needs to be high enough to break the intended target (e.g., frangible sheet material) upon impact yet low enough to be held back without breaking the restraint member. Generally, the restraint member is relatively inelastic, strong under tension yet easily burnable with heat, and breaks instantly with heat as opposed to slowly stretching with a gradual decrease in Young's Modulus. In some implementations, the restraint member can be relatively elastic. In accordance with embodiments that include a resistor as a component of the trigger source, the resistor is preferably designed with a resistance value and power rating to generate high heat from a low-cost battery that last for a sufficient duration to break the restraint member.

Figure 9C:
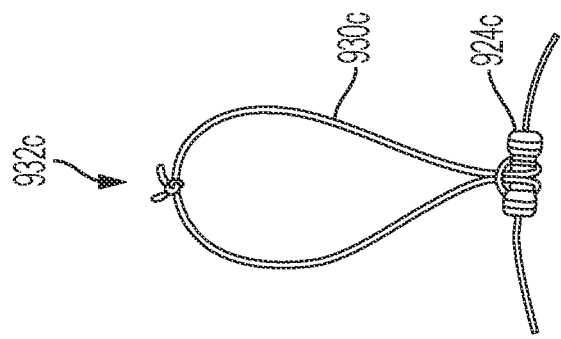
FIGS. 9A-9C show various embodiments for wrapping a resistor heater of a mechanical actuator assembly with a pre-looped string.
Figure 9B:
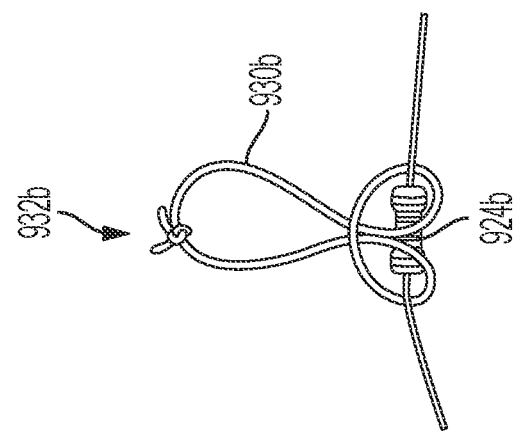
Figure 9A:
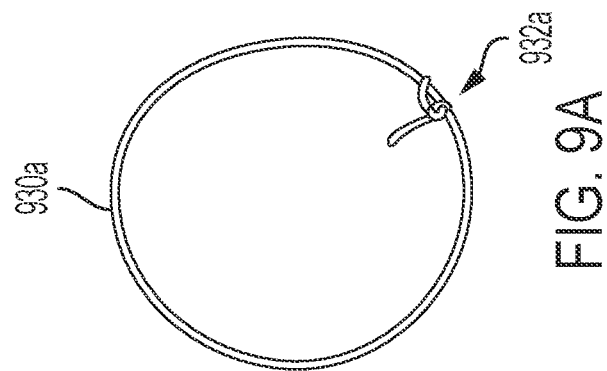

In accordance with embodiments that include tying a restraint member around a resistor such as the embodiment shown in FIG. 8, it is important that the resistor heater is not tied with more than one knot of the restraint member (e.g., string), as multiple knots can keep the string intact even if the wrapped portion of the string gives way upon heater activation. FIGS. 9A-9C show various embodiments for wrapping the resistor heater of a mechanical actuator assembly with a pre-looped string. These methods enable a simple and low-cost way to incorporate a resistor heater into the restraint loop. FIG. 9A shows a pre-looped string 930a with a single knot 932a. FIG. 9B shows a method for wrapping a resistor heater 924b by inserting the looped string 930b upon itself, such that the knot 932b is positioned away from the resistor heater 924b. FIG. 9C shows a resistor heater 924c incorporated into a string restraint with a residual loop 930c for tying down the spring member, such that the knot 932c is positioned away from the resistor heater 924c.

Figure 10A:
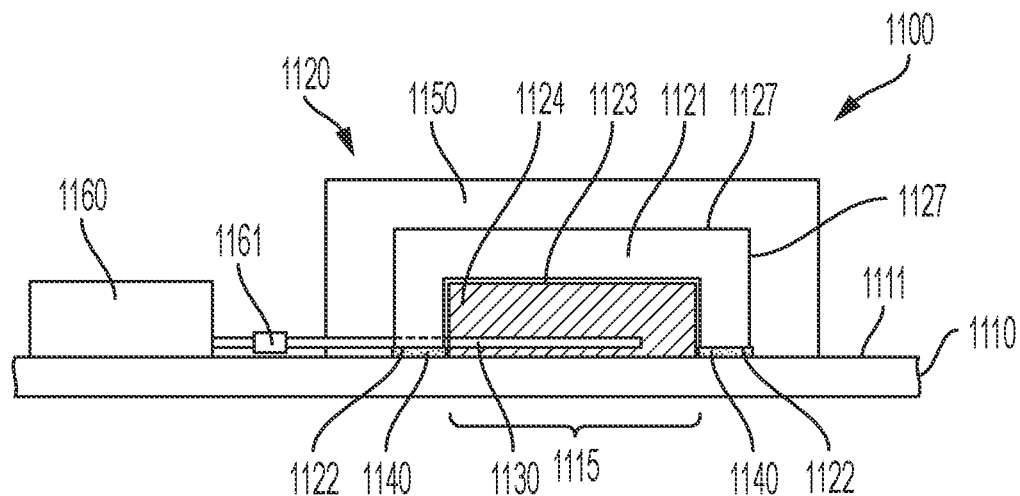
FIGS. 10A-10B, 11, 12, 13A-13E, and 14A-14B illustrate configurations of a triggerable mechanism comprising an electrically-activated pressure device in accordance with various embodiments.
Figure 10B:
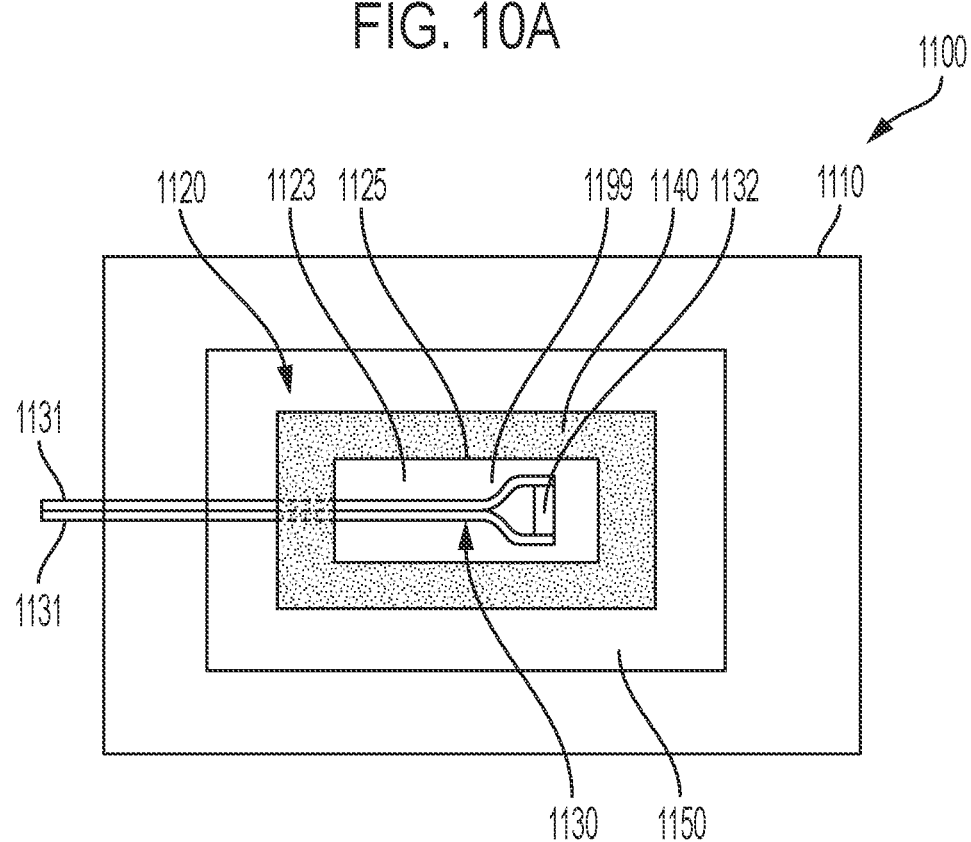
Figure 11:
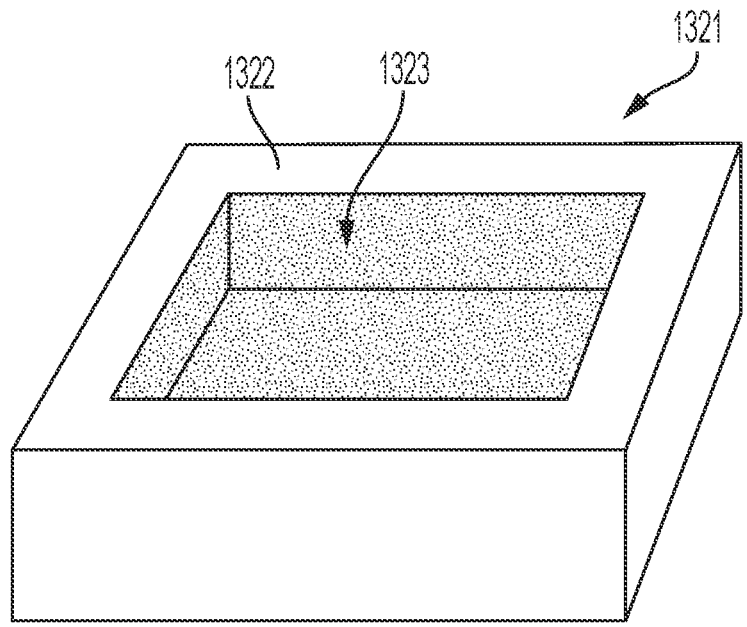

FIGS. 10A-14B illustrate configurations of a triggerable mechanism comprising an electrically-activated pressure device in accordance with various embodiments. FIG. 10A shows a side cross sectional view of a portion of an apparatus 1100 in accordance with some embodiments. The apparatus 1100 includes a structure 1110 to which a pressure vessel 1120 is mounted. The structure 1110 represents any of the structures disclosed herein. FIG. 11 shows a bottom view of the apparatus 1100 from the perspective of looking through a clear structure 1110 in accordance with any of the embodiments disclosed herein. A gas-emitting material 1124 shown in FIG. 10A is absent in FIG. 11 for purposes of clarity of explanation. The structure 1110 may be any type of structure and have any suitable geometrical configuration. In various implementations, the structure 1110 may be made of a brittle or frangible material such as glass, ceramic, plastic, laminated fillers of wood, metal or gypsum, clay, porcelain, and/or metal. Although the structure 1110 may be complex and include many different materials and shapes, the frangible material may be disposed at least at the bonding location 1115 where the pressure device 1120 is bonded to the structure 1110. In many embodiments, the structure 1110 is glass. A glass structure can comprise one or more of cast glass, slumped glass, untempered glass, tempered glass, thermally tempered glass, ion-exchanged glass, soda-lime glass, lead glass, borosilicate glass, aluminosilicate glass, alkali-aluminosilicate glass, silica glass, and sodium-rich glass. The pressure device 1120 can be configured to fracture a glass structure that is more than about 0.5 mm thick at the bonding location 1115 of the structure 1110. For example, the thickness of the structure 1110 at the bonding location 1115 may be about 11 mm thick, about 2 mm thick or even greater than 2 mm thick.

The pressure device 1120 comprises a vessel 1121 having a bonding surface 1122 and an interior space 1123. The bonding surface 1122 bonds the vessel 1121 to a surface 1111 of the structure 1110 at a bonding location 1115 of the structure 1110. A bonding agent 1140 is disposed between the bonding surface 1122 of the vessel 1121 and the surface 1111 of the structure 1110 at the bonding location 1115. The vessel 1121 may be made of a material comprising one or more of a metal, acrylic, plastic, rubber, ceramic, cement, thermoplastic, compacted sand, wood, and glass, for example. The bonding agent 1140 may comprise one or more of various types of epoxies, cyanoacrylates, structural adhesives, steel-reinforced adhesives, silicone, thermoset plastics, acrylic, urethane, UV curable adhesives, ethylene vinyl acetate, solder, welding interface material, and construction adhesives.

The bonding agent 1140 and the bonding surface 1122 are configured to bond the vessel 1121 to the bonding location 1115 on the surface 1111 of the structure 1110 with a bonding force greater than a fracture limit of the structure 1110 over a cross-sectional area 1199 bounded by an inner perimeter 1125 of the interior space 1123 of the vessel 1121 at the bonding surface 1122. The fracture limit is the force at which the structure 1110 fractures. In some implementations, the fracture limit of the structure 1110 at the bonding location 1115 may be greater than about 5 MPa.

According to some implementations, an optional backing material 1150 may be disposed at least partially over the vessel 1121. For example, as shown in FIG. 10A, the backing material 1150 may be disposed over surfaces 1127 of the vessel 1121 opposite and/or adjacent to the bonding surface 1122. The backing material 1150 bonds the vessel 1121 to the surface 1111 of the structure 1110 and may work in conjunction with the bonding agent 1140 to hold the pressure vessel 1120 against the structure 1110. Suitable materials for the backing material 1150 may comprise at least one of concrete, structural adhesives, and an epoxy potting compound, for example.

A gas-emitting material 1124, comprising chemical compounds such as potassium nitrate, sodium azide, ammonium perchlorate, ammonium nitrate, or ammonium dinitramide, is contained within the interior space 1123 of the vessel 1121. In some embodiments, after the vessel 1121 is bonded to the surface 1111, the gas-emitting material 1124 is in contact with or in close proximity to one or both of the surface 1111 of the structure 1110 and the interior surface of the vessel 1121. An electrical initiator 1130 is arranged to activate the gas-emitting material 1124. In other embodiments, the gas-emitting material 1124 is in contact or in close proximity to the electrical initiator 1130 but not in contact with either surface 1111 of the structure 1110 or the interior surface of vessel 1121. Gas-emitting material 1124 may occupy a very small percentage of the volume of interior space 1123 or may fully fill the interior space 1123. As shown in FIGS. 10A and 10B, the initiator 1130 may be disposed within the interior space 1123 of the vessel 1121 and/or may be arranged to be in contact with the gas-emitting material 1124. For example, the initiator 1130 can be embedded within the gas-emitting material 1124 in some implementations with leads (wires 1131) extending from the vessel 1121 as shown in FIGS. 10A and 10B.

The electrical initiator 1130 is energized by a current flowing through a pair of electrically conductive wires 1131 that are electrically connected by an electrically conductive bridge 1132. In some implementations, the bridge 1132 comprises a material having a higher electrical resistance than the wires 1131. For example, the bridge 1132 may be a nichrome alloy and the wires 1131 may be copper or aluminum. According to some implementations, the bridge 132 and/or the wires 1131 are coated with a pyrogenic material. The pyrogenic material coating the bridge 1132 and/or wires 1131 may be the same as or different from the gas-emitting material 1124 that is disposed within the interior space 1123 of the vessel 1121. The pyrogenic coating enhances the heat from the electrical bridge 1132 to more effectively activate the gas-emitting material 1124.

When initiator 1130 is energized by an electric current flowing through the electrically conductive elements 1131, 1132 of the initiator 1130, the gas-emitting material 1124 is heated by the wires 1131, bridge 1132 and/or additional pyrogenic material coating the wires 1131 and/or bridge 1132 to an activation temperature of the gas-emitting material 1124. Activation of the gas-emitting material 1124 causes a rapid release of gas. The rapid release of gas within the vessel 1121, which is tightly bonded to the surface 1111 of the structure 1110, produces a localized pressure that breaks the structure 1110.

As best seen in FIG. 10A, in some embodiments the apparatus 1100 includes a current source 1160, such as a battery, configured to supply the electrical current to the initiator 1130. A switch 1161 electrically connects the source

1160 to the initiator 1130. In some implementations, the switch 1161 (shown in FIG. 10A) can be remotely controlled allowing fracture of the structure 1110 to be triggered from a location remote from the structure 1110. In such an embodiment, a wireless signal activates the switch 1161 to connect the current source 1160 to the initiator 1130. In some implementations, the switch 1161 is a MOSFET transistor that can be turned on or off by applying a bias voltage at the transistor's gate. In another implementation, the switch 1161 is a silicon-controlled rectifier that can be turned on by applying a small current at one of its terminals. In yet another implementation, the switch 1161 can be a mechanical relay switch.

Energizing the initiator 1130 may comprise connecting an electrical source to the initiator 1130 such that the electrical source produces an electrical current through the initiator 1130. Initiators 1130 may be energized using simple 9V alkaline batteries, for example, or with voltage sources of as low as 0.1 V supplying electrical currents of about 1100 mA. In implementations where ease of handling is important, the typical source voltages are 16 to 112 V supplying currents of 2 to 14 amps. Typical portable sources could be Alkaline or Lithium-based batteries. In some configurations, the initiator 1130 may be remotely energized, or may be energized when a timer circuit reaches a predetermined time or elapsed time.

Figure 12:
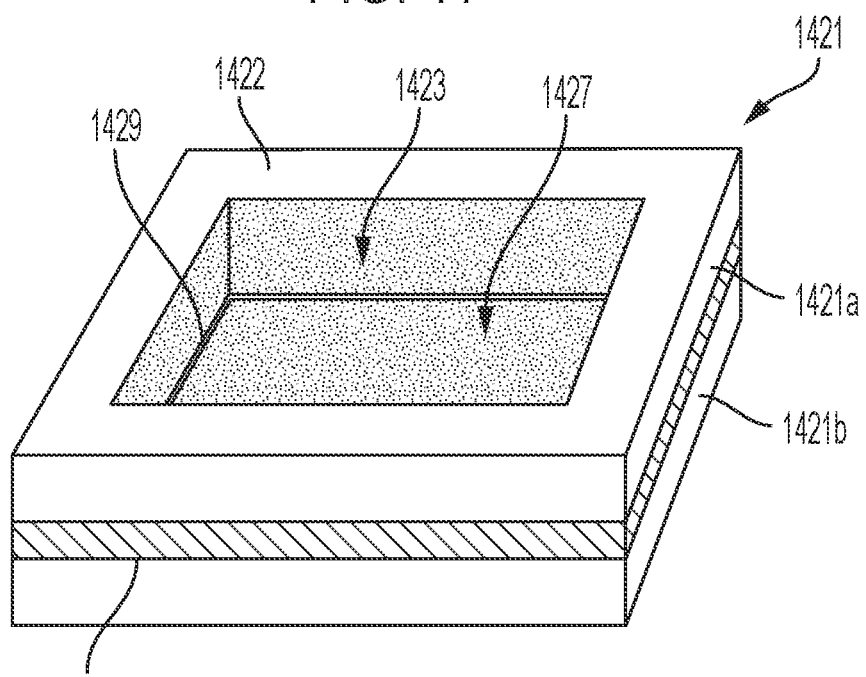

FIGS. 11 and 12 illustrate vessels 1321, 1421 suitable for use in a pressure device in accordance with various configurations. The vessels 1321, 1421 are designed to withstand the impact pressure of the rapidly released gases that occurs upon activation of the gas-emitting material.

FIG. 11 illustrates a vessel 1321 suitable for use in a pressure device in accordance with some configurations. The vessel 1321 is a unitary structure that can be fabricated by subtractive, additive, and/or deformative manufacturing processes to remove, add, and/or deform the material of the vessel 1321 such that the vessel 1321 includes the interior space 1323 and bonding surface 1322.

For example, in some implementations, vessel 1321 may be fabricated from a relatively thick solid piece by removing material, e.g., by milling, and/or cutting to form the interior space 1323 and/or bonding surface 1322. Additive manufacturing processes that can optionally be used to form the vessel 1321 include molding and/or printing. For example, the vessel 1321 may be molded by an injection molding process or other molding processes. As an example of a deformative fabrication process, the vessel 1321 may formed from a relatively thinner solid piece by stamping or otherwise deforming the original piece to form the interior space 1323 and/or the bonding surface 1322.

In some embodiments, as illustrated in FIG. 12, the vessel 1421 may comprise several pieces 1421a, 1421b that are bonded together by a bonding agent 1429. Vessel 1421 may be formed by first piece 1421a having a through hole 1427 and a second piece 1421b that is bonded to the first piece 1421a forming a cover for the hole 1427 in the first piece 1421a. The first and second pieces 1421a, 1421b may be made by any suitable manufacturing process such as waterjet cutting, laser cutting, or processes including those previously discussed in connection with FIG. 11, e.g., milling, cutting, stamping, molding, printing, etc. The bonding agent 1429 may be the same as or different from the bonding material used to bond the vessel to the structure.

Figure 13A:
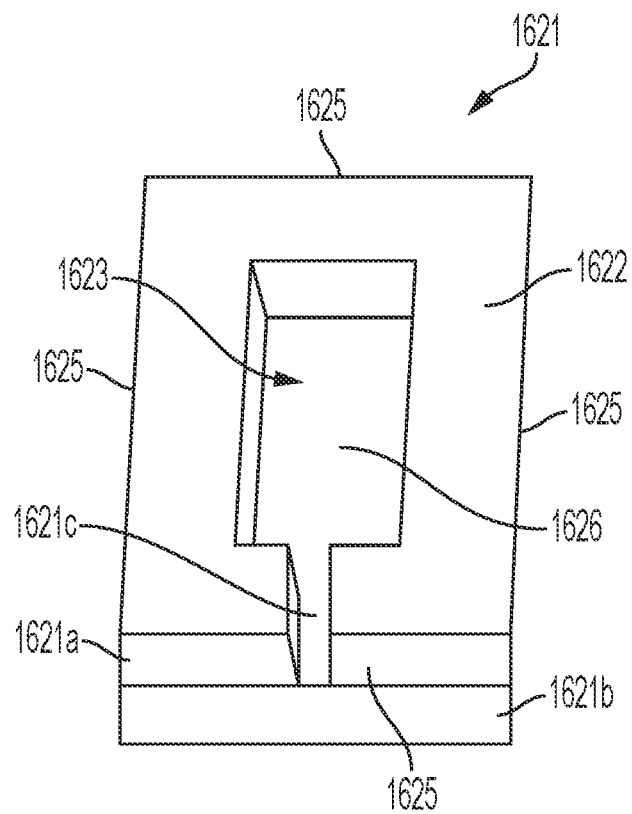
Figure 13B:
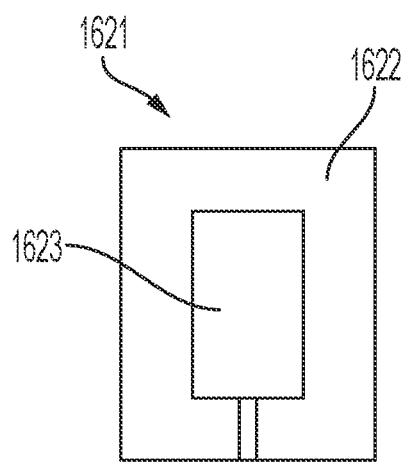

FIGS. 13A through 13E are a series of diagrams that illustrate formation of a pressure device 1620 in accordance with some embodiments. FIG. 13A shows a two-piece vessel 1621 comprising first and second pieces 1621a, 1621b similar to the configuration shown in FIG. 12. The vessel 1621 has an interior space 1623 and bonding surface 1622. The interior space 1623 is defined by the interior surfaces of the walls 1625 and back 1626 of the vessel 1621. The front of the vessel 1621 is open in this example. One wall 1625 of the vessel 1621 includes a channel 1621c that provides a pass through for wires of the initiator. In one particular example, the vessel 1621 has outer dimensions of 25 mm×118 mm with wall thickness of 5 mm as illustrated in FIG. 13B. The thickness of the vessel 1621 may be about 5 mm. These specific dimensions are provided for illustration only; the vessel 1621 and features thereof 1622, 1623, 1625, 1626, 1621a, 1621b, 1621c can have any dimensions that provide for a bonding force greater than a fracture limit of a structure being fractured.

In some embodiments, the ratio of the surface area of the bonding surface to the volume of the interior space is greater than about 0.05 $cm^{-1}$. In some embodiments, the ratio of the surface area of the bonding surface to the volume of the interior space is greater than about 0.6 $cm^{-1}$ and less than about 5 $cm^{-1}$.

Figure 13C:
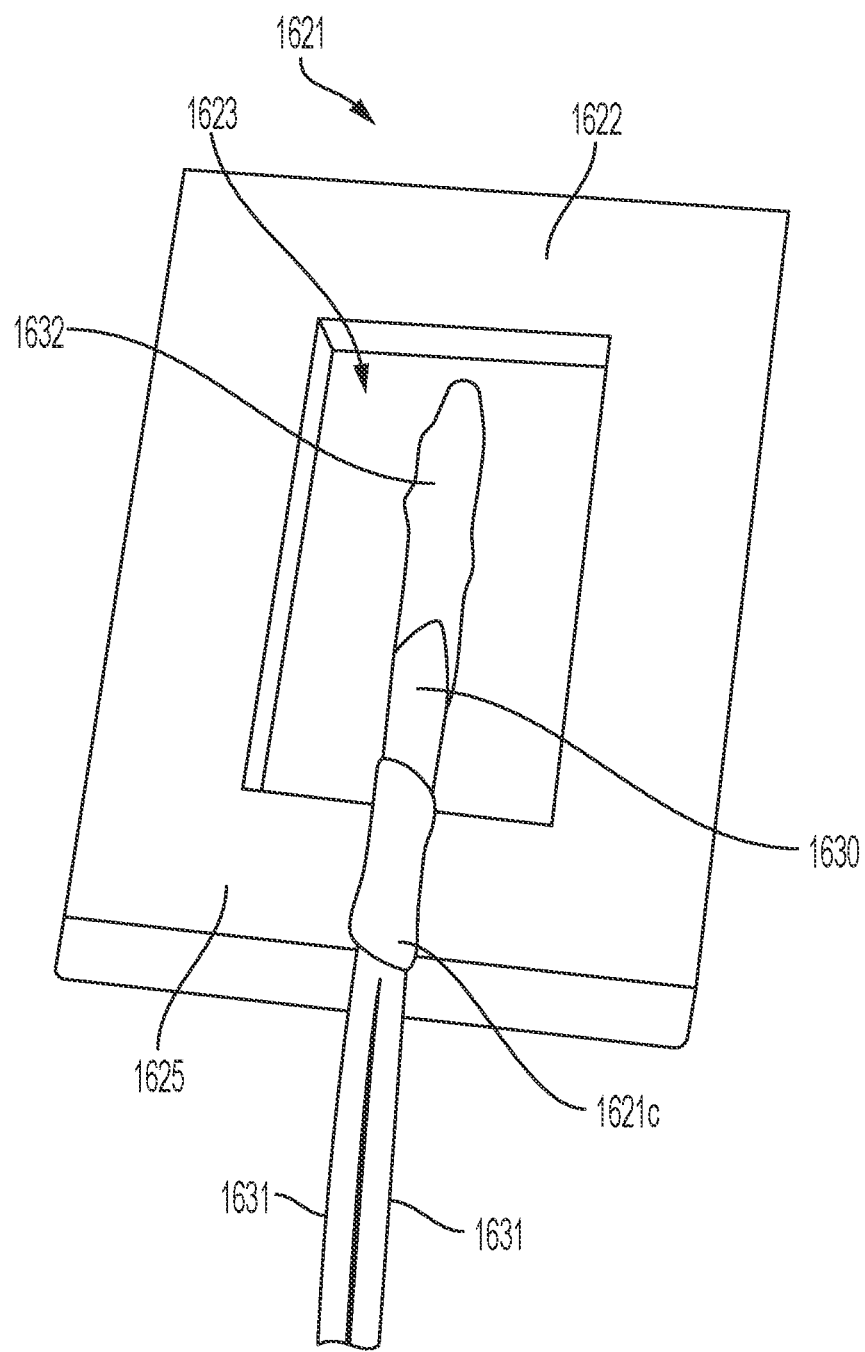
Figure 13D:
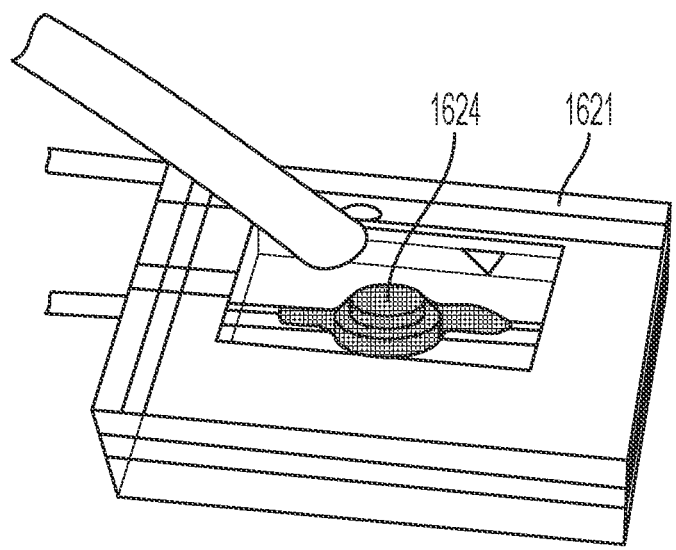
Figure 13E:
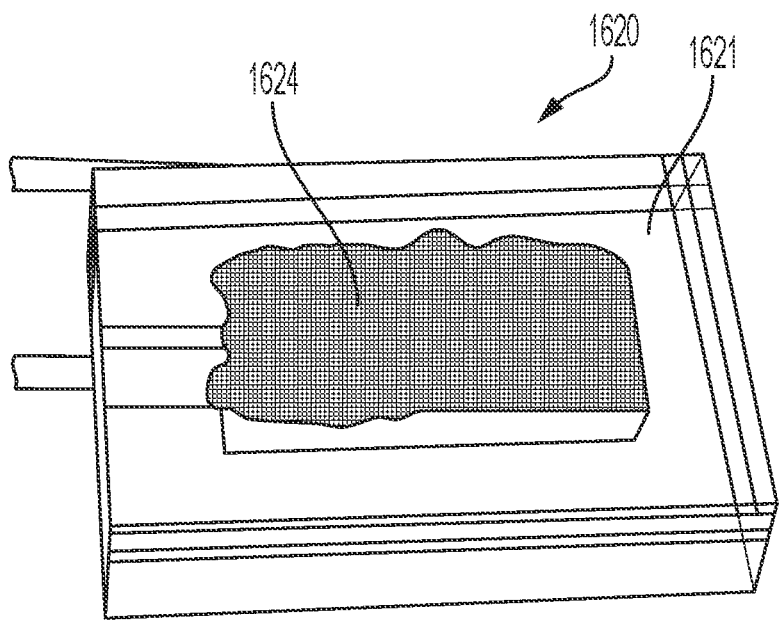

FIG. 13C illustrates the pressure device 1620 after the initiator 1630 is placed inside the interior space 1623 of the vessel 1621. One wall 1625 of the vessel 1621 includes a channel 1621c providing a pass through for wires 1631 of the initiator 1630. The wires 1631 are electrically connected by a bridge 1632 which optionally has a pyrogenic material disposed thereon. FIG. 13D illustrates the process of filling the interior space 1623 with the gas-emitting material 1624. FIG. 13E shows the completed pressure device 1620. In embodiments where bridge 1632 has gas-emitting materials disposed there-on, the step illustrated in FIG. 13D may be omitted.

Figure 14A:
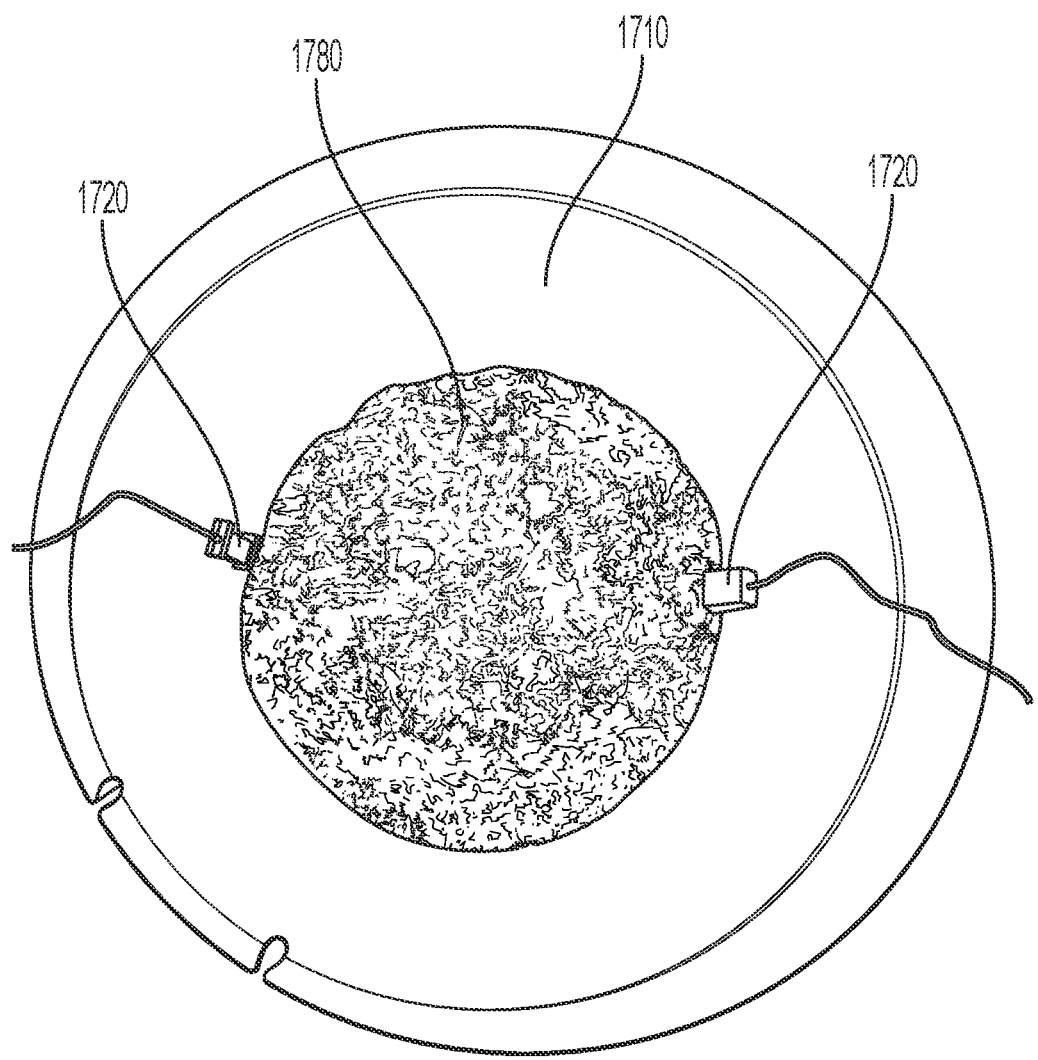
Figure 14B:
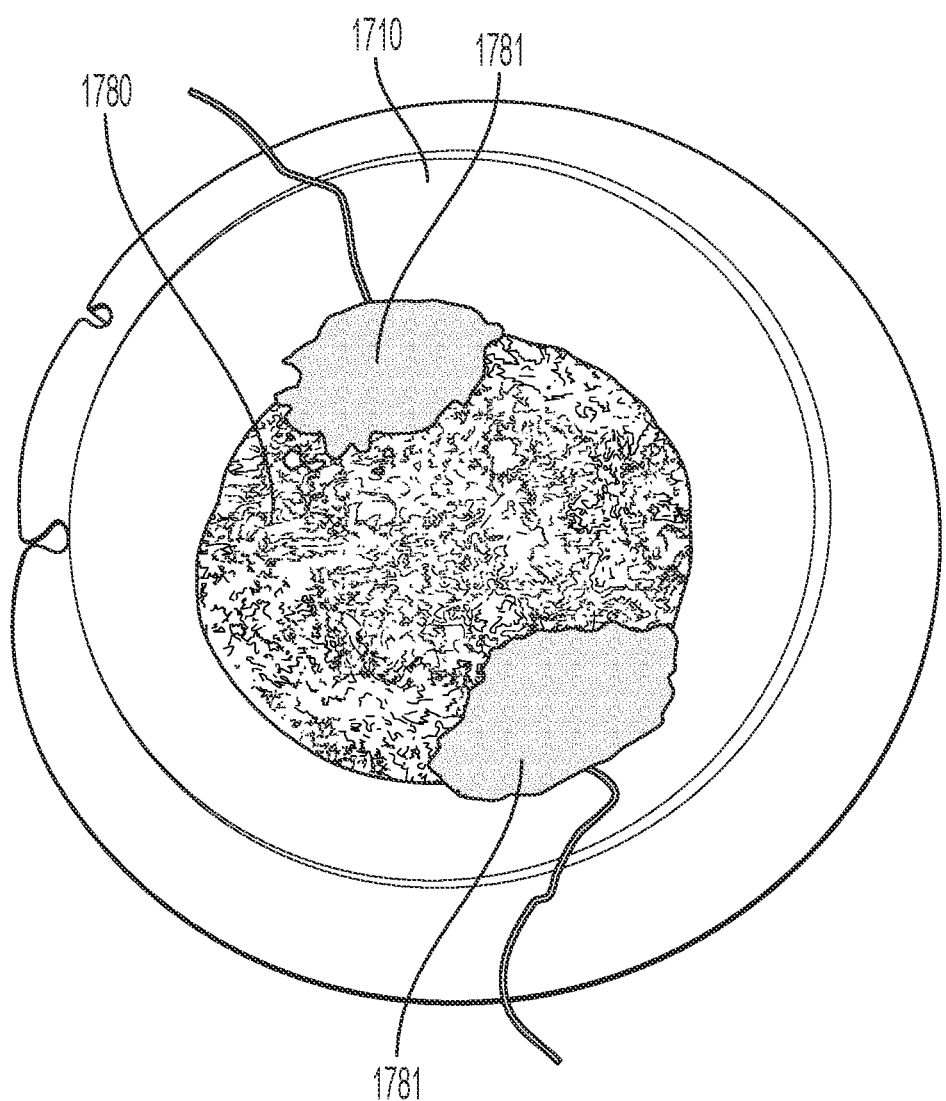

FIGS. 14A and 14B illustrate fabrication of an apparatus that includes a pressure device in accordance with one example. In this particular illustration, the structure is a glass buoy meant to be deployed in the ocean. The buoy can be remotely scuttled when it is no longer needed. The buoy is made of a glass bowl that is bonded to a planar top plate cover to form an enclosure. The enclosure contains sensors, control electronics, optical components, and radio communication devices.

FIG. 14A shows two pressure devices 1720 such as those described herein bonded to an inside surface of glass bowl 1710 of the buoy. The glass bowl 1710 is partially filled with concrete 1780 that functions as ballast. After the pressure devices 1720 are bonded to the glass bowl by a bonding agent, an optional additional amount of concrete 1781 is added as a backing material that partially covers the pressure devices 1720 and further bonds the pressure devices 1720 to the bowl 1710.

In some implementations, the buoy is not entirely made of glass. The enclosure can be mostly plastic or metal that is outfitted with a glass window. In such implementation, the pressure device is bonded on the glass window. Activation of the pressure device causes the glass window to fracture, thereby breaching the enclosure and causing the buoy to sink.

When the initiators within the pressure devices are energized, the gas-emitting material within the pressure devices is activated causing a rapid expansion of gas that produces a force sufficient to fracture the buoy causing it to sink. In some embodiments, the structure fractured by activation of the pressure device may break in to small fragments, e.g., fragments that have length, width, and height dimensions of less than about 110 mm, 900 μm, less than about 500 μm, or even less than about 1100 μm.

Pressure devices used to fracture glass structures include vessels constructed of low-cost laser-cut acrylic, water-jet aluminum, or stamped metal. The vessels can be designed to withstand the impact pressure upon trigger. Unlike most mechanical approaches, the disclosed approach is stable against unintentional trigger. Various pressure devices, and methods using such pressure devices, suitable for use with any of the apparatuses and structures disclosed herein are disclosed in commonly-owned U.S. patent application Ser. No. 16/403,131 filed Nov. 19, 2020, which is incorporated herein by reference in its entirety.

Although reference is made herein to the accompanying set of drawings that form part of this disclosure, one of at least ordinary skill in the art will appreciate that various adaptations and modifications of the embodiments described herein are within, or do not depart from, the scope of this disclosure. For example, aspects of the embodiments described herein may be combined in a variety of ways with each other. Therefore, it is to be understood that, within the scope of the appended claims, the claimed invention may be practiced other than as explicitly described herein.

All references and publications cited herein are expressly incorporated herein by reference in their entirety into this disclosure, except to the extent they may directly contradict this disclosure. Unless otherwise indicated, all numbers expressing feature sizes, amounts, and physical properties used in the specification and claims may be understood as being modified either by the term "exactly" or "about." Accordingly, unless indicated to the contrary, the numerical parameters set forth in the foregoing specification and attached claims are approximations that can vary depending upon the desired properties sought to be obtained by those skilled in the art utilizing the teachings disclosed herein or, for example, within typical ranges of experimental error.

The recitation of numerical ranges by endpoints includes all numbers subsumed within that range (e.g. 1 to 5 includes 1, 1.5, 2, 2.75, 3, 3.80, 4, and 5) and any range within that range. Herein, the terms "up to" or "no greater than" a number (e.g., up to 50) includes the number (e.g., 50), and the term "no less than" a number (e.g., no less than 5) includes the number (e.g., 5).

The terms "coupled" or "connected" refer to elements being attached to each other either directly (in direct contact with each other) or indirectly (having one or more elements between and attaching the two elements). Either term may be modified by "operatively" and "operably," which may be used interchangeably, to describe that the coupling or connection is configured to allow the components to interact to carry out at least some functionality (for example, a radio chip may be operably coupled to an antenna element to provide a radio frequency electric signal for wireless communication).

Terms related to orientation, such as "top," "bottom," "side," and "end," are used to describe relative positions of components and are not meant to limit the orientation of the embodiments contemplated. For example, an embodiment described as having a "top" and "bottom" also encompasses embodiments thereof rotated in various directions unless the content clearly dictates otherwise.

Reference to "one embodiment," "an embodiment," "certain embodiments," or "some embodiments," etc., means that a particular feature, configuration, composition, or characteristic described in connection with the embodiment is included in at least one embodiment of the disclosure. Thus, the appearances of such phrases in various places throughout are not necessarily referring to the same embodiment of the disclosure. Furthermore, the particular features, configurations, compositions, or characteristics may be combined in any suitable manner in one or more embodiments.

The words "preferred" and "preferably" refer to embodiments of the disclosure that may afford certain benefits, under certain circumstances. However, other embodiments may also be preferred, under the same or other circumstances. Furthermore, the recitation of one or more preferred embodiments does not imply that other embodiments are not useful and is not intended to exclude other embodiments from the scope of the disclosure.

As used in this specification and the appended claims, the singular forms "a," "an," and "the" encompass embodiments having plural referents, unless the content clearly dictates otherwise. As used in this specification and the appended claims, the term "or" is generally employed in its sense including "and/or" unless the content clearly dictates otherwise.

As used herein, "have," "having," "include," "including," "comprise," "comprising" or the like are used in their open-ended sense, and generally mean "including, but not limited to." It will be understood that "consisting essentially of," "consisting of," and the like are subsumed in "comprising," and the like. The term "and/or" means one or all of the listed elements or a combination of at least two of the listed elements.

The phrases "at least one of," "comprises at least one of," and "one or more of" followed by a list refers to any one of the items in the list and any combination of two or more items in the list.

What is claimed is:

1. An apparatus, comprising:
   a frangible structure coupled or integral to at least a portion of the apparatus;
   an electrically activated triggerable mechanism disposed at or proximate the frangible structure, the triggerable mechanism configured to break the frangible structure in response to a trigger signal; and
   a containment structure disposed on or over at least a portion of the frangible structure, the containment structure configured to allow at least the portion of the frangible structure to deform or change shape in response to breaking of the frangible structure while keeping substantially all fragments of at least the portion of the broken frangible structure together;
   wherein the frangible structure comprises a sheet of glass or a sheet of tempered glass.

2. The apparatus of claim 1, wherein:
   the apparatus is configured as a floatation apparatus; and
   the triggerable mechanism is configured to break the frangible structure in response to the trigger signal so as to cause the floatation apparatus to lose buoyancy.

3. The apparatus of claim 1, wherein:
   the apparatus is configured for floatation in a body of water; and
   all or a portion of an external surface of the apparatus comprises an anti-biofouling chemical coating.

4. The apparatus of claim 1, wherein the containment structure is configured to substantially confine the fragments within the containment structure.

5. The apparatus of claim 1, wherein the containment structure comprises an adhesive coating disposed on or over at least the portion of the frangible structure.

6. The apparatus of claim 1, wherein the containment structure comprises a rigid or semi-rigid shell disposed on or over at least the portion of the frangible structure.

7. The apparatus of claim 1, wherein the containment structure comprises a compliant material disposed on or over at least the portion of the frangible structure.

8. The apparatus of claim 1, wherein the containment structure comprises an overlay material configured to allow at least the portion of the frangible structure to deform or change shape in response to breaking of the frangible structure while keeping substantially all the fragments together.

9. The apparatus of claim 1, comprising a patterned overlay layer configured to keep some of the fragments attached in one or more specified regions of the frangible structure while allowing others of the fragments to disperse in other regions of the frangible structure.

10. The apparatus of claim 1, wherein:
the apparatus comprises at least one non-frangible structure; and
the containment structure is disposed on or over an entirety of the frangible structure.

11. The apparatus of claim 1, wherein:
the apparatus comprises at least one non-frangible structure; and
the containment structure is disposed on or over only the portion, but not the entirety, of the frangible structure, such that the containment structure is configured to allow at least the portion of the frangible structure to deform or change shape in response to breaking of the frangible structure while keeping substantially all fragments together.

12. The apparatus of claim 1, wherein the triggerable mechanism comprises one or more of a pressure vessel, a mechanical torsion spring, and a mechanical spring steel.

13. A method, comprising:
receiving a trigger signal by an apparatus comprising a frangible structure;
breaking the frangible structure by an electrically activated triggerable mechanism of the apparatus in response to the trigger signal; and
allowing, by a containment structure disposed on or over at least a portion of the frangible structure, at least the portion of the frangible structure to deform or change shape in response to breaking of the frangible structure while keeping substantially all fragments of at least the portion of the broken frangible structure together;
wherein the frangible structure comprises a glass container.

14. The method of claim 13, wherein:
the apparatus is configured as a floatation apparatus; and
breaking the frangible structure by the triggerable mechanism causes the floatation apparatus to lose buoyancy.

15. The method of claim 13, wherein the containment structure substantially confines the fragments within the containment structure.

16. The method of claim 13, wherein the containment structure comprises one or more of:
an adhesive coating disposed on or over at least the portion of the frangible structure;
a rigid or semi-rigid shell disposed on or over at least the portion of the frangible structure; and
a compliant material disposed on or over at least the portion of the frangible structure.

17. The method of claim 13, wherein:
the containment structure comprises an overlay material; and
the containment structure allows at least the portion of the frangible structure to deform or change shape in response to breaking of the frangible structure while keeping substantially all the fragments together.

18. The method of claim 13, wherein the apparatus comprises a patterned overlay layer that keeps some of the fragments attached in one or more specified regions of the frangible structure while allowing others of the fragments to disperse in other regions of the frangible structure.

19. The method of claim 13, wherein:
the apparatus comprises at least one non-frangible structure; and
the containment structure is disposed on or over an entirety of the frangible structure.

20. The method of claim 13, wherein:
the apparatus comprises at least one non-frangible structure;
the containment structure is disposed on or over only a portion, but not the entirety, of the frangible structure; and
the containment structure allows the portion of the frangible structure to deform or change shape in response to breaking of the frangible structure while keeping substantially all fragments together.

21. The method of claim 13, wherein the triggerable mechanism comprises one or more of a pressure vessel, a mechanical torsion spring, and a mechanical spring steel.

22. An apparatus, comprising:
a frangible structure coupled or integral to at least a portion of the apparatus and comprising a pre-weakened region; and
an electrically-activated triggerable mechanism disposed at or proximate the pre-weakened region, the triggerable mechanism configured to cause the pre-weakened region to break in response to a trigger signal;
wherein the apparatus is configured as a floatation apparatus and the triggerable mechanism is configured to break the frangible structure in response to the trigger signal so as to cause the floatation apparatus to lose buoyancy.

* * * * *